(12) United States Patent
Kelman et al.

(10) Patent No.: US 6,850,896 B1
(45) Date of Patent: Feb. 1, 2005

(54) METHOD AND SYSTEM FOR MANAGING AND PROVIDING SALES DATA USING WORLD WIDE WEB

(75) Inventors: Ariel Kelman, San Francisco, CA (US); Corey Sommers, Scottsdale, AZ (US)

(73) Assignee: Market-Touch Corporation, San Francisco, CA (US)

( * ) Notice: Subject to any disclaimer, the term of this patent is extended or adjusted under 35 U.S.C. 154(b) by 0 days.

(21) Appl. No.: 09/429,240

(22) Filed: Oct. 28, 1999

(51) Int. Cl.[7] .............................................. G06F 17/60

(52) U.S. Cl. ............................. 705/10; 705/11; 705/26; 707/201

(58) Field of Search .............................. 705/1, 7, 8, 10, 705/11, 26; 709/250, 129; 707/513, 200–204; 345/689

(56) References Cited

U.S. PATENT DOCUMENTS

| | | | | | |
|---|---|---|---|---|---|
| 5,493,490 | A | * | 2/1996 | Johnson ...................... | 235/376 |
| 5,737,533 | A | * | 4/1998 | de Hond ..................... | 709/219 |
| 5,799,320 | A | * | 8/1998 | Klug .......................... | 707/201 |
| 5,826,240 | A | * | 10/1998 | Brockman et al. ............ | 705/11 |
| 5,870,717 | A | * | 2/1999 | Wiecha ....................... | 705/26 |
| 5,890,149 | A | | 3/1999 | Schmonsees | |
| 6,055,513 | A | * | 4/2000 | Katz et al. .................... | 705/26 |
| 6,070,149 | A | * | 5/2000 | Tavor et al. ................. | 705/26 |
| 6,092,121 | A | * | 7/2000 | Bennett et al. ............ | 709/250 |
| 6,122,648 | A | * | 9/2000 | Roderick .................... | 707/513 |
| 6,167,406 | A | * | 12/2000 | Hoskins et al. ............. | 707/102 |
| 6,282,517 | B1 | * | 8/2001 | Wolfe et al. .................. | 705/26 |
| 6,411,965 | B2 | * | 6/2002 | Klug .......................... | 707/201 |
| 6,446,261 | B1 | * | 9/2002 | Rosser ........................ | 725/34 |
| 6,449,597 | B1 | * | 9/2002 | McGill .......................... | 705/1 |

FOREIGN PATENT DOCUMENTS

GB 514231 A2 * 11/1992 ............. G06F/15/21

OTHER PUBLICATIONS

Specification of a Rapid Prototyping Capability for the Automated Patent System, Kathleen A. Jordan, Anthony J. Zawilski. IEEE 1990, 0730–3157/90/0000/0076.*
The Sant Corporation; RFP Master; Oct. 27, 1999; pp. 1–2; www.santcorp.com (website sales presentation).
The Sant Corporation; Presentation Builder; Oct. 27, 1999; p. 1; www.santcorp.com (website sales presentation).
The Sant Corporation; Proposal Master; Oct. 27, 1999; pp. 1–2; www.santcorp.com (website presentation).
The Sant Corporation, Sant Products; Oct. 27, 1999; pp. 1–2; www.santcorp.com (website sales presentation).
UpShot.com; UpShot Online; 1999 UpShot.com; pp. 1–4.
UpShot.com; UpShot Online Admin Guide; 1998–1999 UpShot.com; pp. 1–4.
UpShot.com; UpShot Online Admin Guide; 1998–1999 UpShot.com; pp. 1–134.

* cited by examiner

*Primary Examiner*—Tariq R. Hapiz
*Assistant Examiner*—M. Irshadullah
(74) *Attorney, Agent, or Firm*—Paul Davis; Heller Ehrman White & McAuliffe

(57) ABSTRACT

A method and system for managing sales data. One embodiment is a software application that assists in classification, review and approval of data to be stored in a database for the use of a product supplier or seller. In one embodiment, a method includes storing a plurality of data components as groups of data components in a database, wherein the plurality of data components comprises information relating to products, and information relating to customers. The method further includes assigning a subset of the plurality of users to a content review group ("CRG"), and notifying each user in the CRG to provide input regarding individual data components of a group of data components. Input may include indicating whether data components are accurate, entering comments regarding the data components, entering edits to the data components. The method further includes receiving and storing the input, notifying a content director ("CD") to review the input. Review may include editing the comments entered, deleting the comments entered, and consolidating the input. At least one of the data components is staged to be stored in a central database, based upon the review.

3 Claims, 42 Drawing Sheets

| Detailed Feature Discussion | Feature Discussion | Business Value | Business Impact | Success Story |

Multi-domain administration support

Message Mart vs. Software     Message Mart vs. Software GO!

Message Alert
Unitech Message Mart's multi-domain management system provides basic functionality for managing large scale, multi-domain environments.

However, it lacks key features that professional system managers have come to expect and rely on. Chief among these are the lack of drag-and-drop functionality and the inability to view the hierarchical structure of the clustered domains.

Objects

Analyst Comment:
"Message Mart does not provide a complete multi-domain management system. Its functionality does not include drag-and-drop capabilities nor viewer ability to see hierarchical structure of clustered domains." -Franklin Group, January 1999

Softmate GO!
Softmate GO! domain management makes [COMPANY]'s administration easy and intuitive with a specialized, task-oriented interface. Softmate leverages existing skills and experiences of administrators for [PROJECT]. It also allows dragging and dropping functionality and the administration process takes care of all the back-end steps to successfully accomplish tasks. It provides an immediate hierarchical view of multiple domains, gives context specific task choices, and adds immediate results to implemented administration steps in a single interface.

Objects
· Software Multi-domain support

Analyst Comment:
"Ramp-up time in minimal with Softwerks Softmate GO! because of its extremely intuitive interface. The multi-domain environment is robust, providing context specific tack choices and immediate results." - NETMAG, January 1999

*FIG. 4*

| Detailed Feature Discussion | Feature Discussion | Business Value | Business Impact | Success Story |

Message Mart vs. Software - Multi-domain administration support

Lower IT Support Costs by 15%

Efficient messaging systems help increase user self-reliance, reducing the need for IT support.

Objects
- How to Get More from IT Department

Reduce Number of IT Personnel by 10%

Efficient messaging systems help increase user self-reliance, reducing the need for IT support. In turn, there is less of a need for IT personnel support in administering and maintaining the system.

Objects
No Available Objects

FIG. 5

| Detailed Feature Discussion | Feature Discussion | Business Value | Business Impact | Success Story |

Message Mart vs. Software - Multi-domain administration support
Morris Manufacturing Finds a Cure For Administration Headaches

Multi-domain administration support:

Softmate:
Morris Manufacturing is a diversified utilities company. Since processes require the involvement of employees of various disciplines located across the country, Mason needed a communication solution that would accommodate administering all messaging infrastructure from one location. Softwerks Softmate multi-domain administration support proved to be the solution for him. Since the summer of 1997, about 50 employees have been using Softmate. Vanderhoff and his colleagues' highly value Softmate's simplified administration.

"We really like the task-oriented single point of administration interface. It is simple and intuitive and really relieves us of some big administration headaches." -Wallace Vanderhoff, Director of Corporate Regulatory Affairs, Morris Manufacturing.

Easily Administer the System:
Morris Manufacturing is a diversified manufacturing company that needed a communication solution that would accommodate administering all messaging infrastructure from one location. Softwerks Softmate multi-domain administration support proved to be the solution. Highly valued is Softmate's simplified administration tools that allow views into every part of Morris' corporate messaging system.

"We really like the task-oriented single point of administration interface. It is simple and intuitive and really relieves us of some big administration headaches." -Wallace Vanderhoff, Director of Corporate Regulatory Affairs, Morris Manufacturing.

Objects
- Morris Manufacturing Logo
- Multi-Domain Support

King Industries Deals With Decentralization ★

Easily Administer the System:
King Industries is a global manufacturer that currently uses a variety of messaging systems, including Softwerks Mail, Versasoft Mailsuite, and Digitex Mailworks. System administrators had previous difficulties managing so many systems until Softmate helped provide more efficient, effective administration. Softmate helped provide a central interface for user and group management and key administration tools that made for easy, stress-free administration.

"It's a headache to keep all these systems running with all of these different divisions and e-mail administrators. Mail gets lost and we don't know why. My ultimate goal with Softmart is to manage everything from a central location..." -Victor Smith, Chief Information Officer, (CIO) for King Defense and Electronics

Objects
- King Industries Reap the Rewards of Centralized Messaging
- King Industries Logo

*FIG. 6A*

- King Industries Case Study

Palamino Uses Softmate to Validate Transaction Process ★

Easily Administer the System:
With the additional benefit of having access to Softmate technologies, Palamino can very easily administer the messaging system and is able to validate transaction processes more efficiently than ever before.

"Softmate's back-end functionality has made it easier than I ever could have expected to validate transaction processes. I never would have expected to find such a robust and easy to use tool in messaging." -John Dolan, Help Desk Representative, Palamino

Objects
- Palamino Case Study
- Palamino logo

Crookham Telecom Leverages Softmates' Centralized Administration ★

Easily Administer the System:
Crookham Industries has been really impressed with the ease of administration functions and effective management of and users. This is a key result of the capabilities of the shared folders. These shared folders are helpful for Crookham's vast number of committees and task forces that are required to be able to collaborate on projects.

"It's pretty simple to troubleshoot, and it doesn't take a long time to grasp the knowledge of the system." -John Adams, Network Manager, Crookham Telecom

Objects
- Crookham Telecom Leverages Softmates' Centralized Administration
- Crookham Telecom Logo

View Metadata

Softmate GOI PDA Access
Entry Date: 07/22/1999
Last Update: 07/29/1999
User Name: Jason Wong
Data Source: Not Defined

*FIG. 23*

SOFTWERKS

Home | Options | Help | Log Out

Compare  Research  Generate  Bulk  Analyze

- Companies
- Elements
- Business Requirements
- Business Impacts
- Objections
- Success Stories
  - Search By Attributes
  - Search By Market-Touch
  - Browse All

Success Stories-Search By Customer Attributes
Please choose from the lists below and press the Submit button.

Customer Attribute
All

Customer Attribute
Size of Company
1000-5000 Users
500-1000 Users
Less Than 500 Users
Revenues

[Add] [Clear] [Submit]

Valid Success Stories (0)

Success Story Query Criteria

Size of Company
- 1000-5000 Users

Powered by

*FIG. 25*

SOFTWERKS

Home | Options | Help | Log Out

Compare  Research  Generate  Bulk  Analyze

Success Stories-Search By Customer Attributes
Please choose from the lists below and press the Submit button.

- Companies
- Elements
- Business Requirements
- Business Impacts
- Objectives
- Success Stories
  - Search By Attributes
  - Search By Market-Touch
  - Browse All

Customer Attribute
All

Customer Attribute
Size of Company
1000-5000 Users
500-1000 Users
Less Than 500 Users
Revenues

[Add ⊕] [Clear ⊖] [Submit ⊙]

Success Story Query Criteria

Revenues
- $200M Plus

Size of Company
- 1000-5000 Users

Valid Success Stories (5)
Abbey Mark Manufacturing goes....

Abbey Mark Manufacturing goes with Softmate GO! in Groundbreaking Deal ★

Abbey Mark is a manufacturing of premium automotive lubrication components. The company has a market capitalization of $6 billion with employees in more than a dozen countries. As the number two lubrication components manufacturer in the world, the sales force must travel extensively worldwide and relies heavily on the portable support tools available to support the sales function.

Abbey Mark rolled out its Softmate GO! implementation company-wide and now has more than 4000 dedicated users. With the Softmate GO! full integration with hand held computing devices and GSL dialing in capabilities, Abbey has been able to reduce hardware cost by more than $500 per user.

"My effectiveness has improved dramatically since I started using Softmate GO! messaging systems while on the road. Now I can check messages from anywhere on the road and communicate with my manager without having to use a traditional telephone hook-up. I don't know how I ever lived without this tool," Dana Smith, Senior Account Manager, Pacific Rim Powered by

*FIG. 26*

Request For Information

Submitted by: Mary Smith
October 21, 1999

International Manufacturing is submitting this Request for information to selected vendors to evaluate solution and service offerings for the CTD project. Please provide detailed information about how your solution or service implements the following desired elements. If you have any questions regarding this RFI, please contact Mary Smith at 415-421-2390, or email to msmith@softwerks.com.

Please provide the following information:

Vendor Name:

Vendor Address:

Vendor Contact:

Vendor Phone:

Vendor Email: _____

Administration

*FIG. 28*

| Element | Description | How is this element implemented in your solution? |
|---|---|---|
| Central administration | Central administration provides International Manufacturing with a single interface for all messaging and collaboration management functions such as shared mail management, assigning mailbox quotas, establishing mail routing topology, and workgroup tracking. Toolsets that do not provide a central management interface burden administrators with multiple applications, each designed to address specific management challenges. Consolidating the management toolset provides economies, particularly in complex environments where sophisticated messaging and collaboration architectures must be maintained to facilitate day to day business operations at International Manufacturing. | |
| Multi-domain administration support | Multi-domain administration support allows International Manufacturing to administer all messaging infrastructure, including files, servers, messaging, and configuration, from one location. | |
| Effective management of end users and data | The ability to effectively manage end users and data is vital for International Manufacturing. This includes the flexibility to design directory details to suit each organization's requirements. | |

Handheld Messaging

*FIG. 29A*

| Element | Description | How is this element implemented in your solution? |
|---|---|---|
| PDA access | PDA access to messages provides International Manufacturing with mobile support for employees who are often on the road. With PDA access, employees have full messaging capabilities without needing access to conventional modems and grounded telephone connections. | |

FIG. 29B

SOFTWERKS

Response Reports

Solutions
by solution
by mouth
by market segment
by state
by customer company

Business Requirements
by business requirements
by mouth
by market segment
by state
by customer company

Elements
by element
by mouth
by market segment
by state
by customer company

Usage Reports
opportunities by user
user by mouth
user by market segment
documents by user Compare | Research | Generate | Build | Analyze Home | Options | Help | Log Out Query Type: All ○ Sales effect ●○ InContinue

Document by User

| Username | Document | Count |
|---|---|---|
| | Total - 106 | |
| Corey Suhmers | PowerPoint Presentation | 55 |
| | Competitive Research Report | 49 |
| | Dynamic Data sheet | 31 |
| | Follow Up Letter | 30 |
| | Pain Sheet | 28 |
| | Request for Information | 24 |
| | Requirements Analysis | 18 |
| | Executive Pitch Letter | 5 |
| | Sales Strategy | 5 |
| | Subtotal: 245 | |
| Kyle Lisaack | Competitive Research Report | |
| | Follow up Letter | 1 |
| | Subtotal: | | http://10:10:10:234:2340/Analyze/dril.cfm?action=solutionmarketsegment&product_id=211/option_flag=&prompt21

FIG. 33

(icon) Data Maintenance:

(icon) DataGem Groups (icon) Content Review Groups (icon) E-mail Properties

510

DataGem Group 1 [ARCH_DATAGEM GROUPS.GROUP_DESC]
DataGem Group 2
DataGem Group 3

(right click on DataGem Group name and menu displays include ('Add', 'Rename', 'Duplicate', and 'Delete'))

(When DataGem Group name above is clicked, name above stays highlighted and the below information displays)
Name: DataGem Group 1
Content          [High Tech ▼]   Market-Touch Category

[Solutions ▼]    Market-Segment(**only appears
for b-req, solutions, or success stories are selected in a category drop down; filters
the category list if applicable)

[Informatica ▼]   Category List      [Add]

[Supports multi-select. lists all solutions here, including right click delete functionality];
Category     Category List     Last Modified Date ☐ Active DataGem Group [ARCH_GROUPS_ACTIVE]

☐ Process Immediately

Review Cycle [____] [ARCH_DATAGEM GROUPS.AUDIT_CYCLE]     [Save]

*FIG. 37*

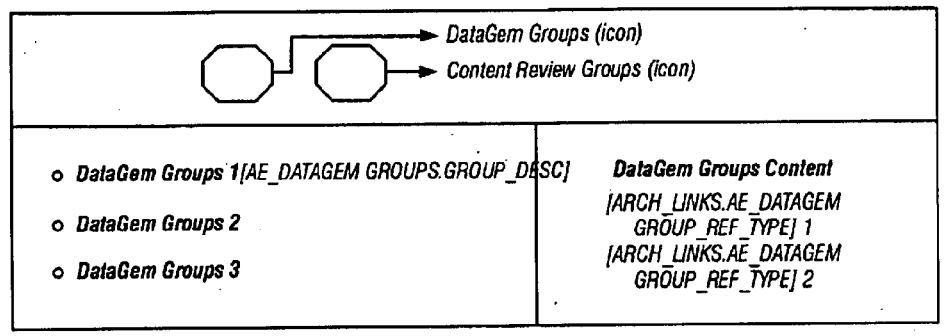
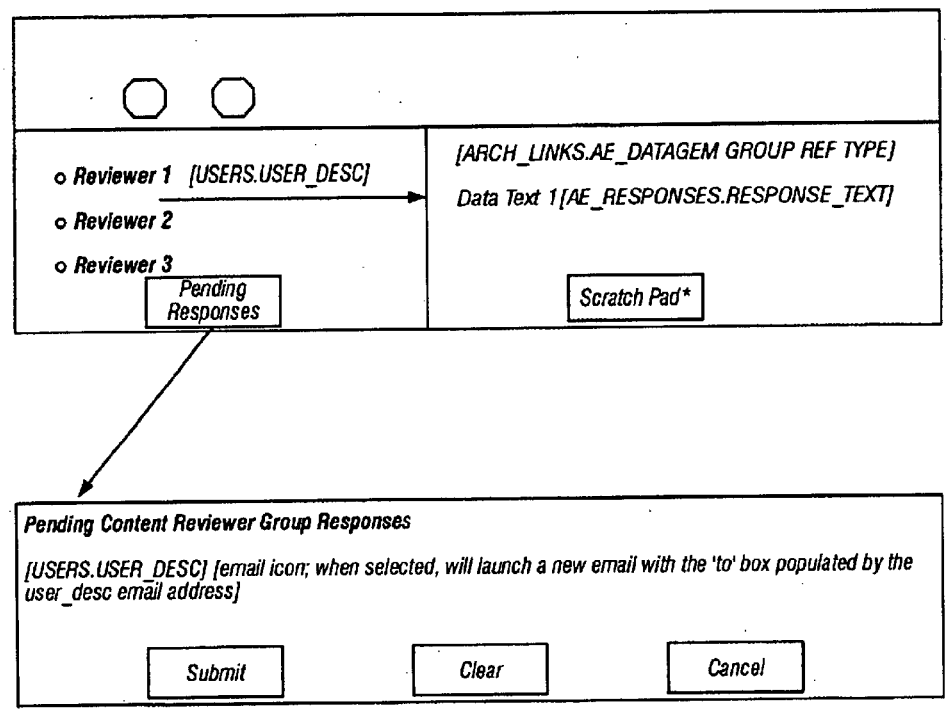
FIG. 39

US 6,850,896 B1

METHOD AND SYSTEM FOR MANAGING AND PROVIDING SALES DATA USING WORLD WIDE WEB

FIELD OF THE INVENTION

The present invention is in the field of software products to automate sales processes. In particular, the present invention is in the field of computer-based sales tools.

BACKGROUND OF THE DISCLOSURE

In the business environment today, especially for business sectors in which products are technologically complex and expensive, corporations must collect and efficiently use large amounts of data in order to maximize sales. Customer's needs have become more diverse, product lines have become more varied, and competitors have become more numerous. Therefore, it is important when attempting to sell complex products to a particular customer to provide the customer with accurate information that relates to their specific needs and shows how well various products meet those needs. For example, if a salesperson is able to present information to a prospect that distinguishes the salesperson's product from the competition in exactly the areas of interest to the prospect, the salesperson is more likely to make the sale. Technology enabled selling ("TES") has evolved to provide various tools and techniques to aid salespersons in obtaining useful sales information. For example, several sales force automation ("SFA") tools exist. In general, most of these SFA tools allow collection data of interest in a database and access to the database to obtain or generate sales information.

Current TES products have several important limitations. For example, very few TES applications assist the "in-the-trenches" salesperson with the actual job of selling. Those that do have some functionality for the salesperson are very inflexible and may not be helpful in situations that are not well adapted to the kind of information provided by the tool. Most current TES products lack functionality for supporting product positioning, competitor differentiation, feature-advantage-benefit discussion, and opportunity qualification. Those current TES products that provide some of the functionalities listed provide only a limited subset and provide it in an inflexible way, limiting its usefulness for the salesperson. For example, some current TES products aid in sales proposal generation or presentation generation, yet one product does not allow for generation of more than one type of document. Another disadvantage of these products is that the documents produced are basically inflexible templates that are populated by data in a predetermined way such that minimal or no salesperson knowledge is allowed to influence the kind of information produced. Therefore, important data known to the salesperson, such as special requirements or desires of a specific customer, might not be taken into account in producing documents. Some existing TES products may help salespersons to respond to product and competitive issues, but the salesperson is still left with considerable responsibilities to close the deal. For example, the salesperson must still finish the sales job by gathering validating customer stories, supporting analyst quotes, and value propositions. These must all then be and presented to the sale prospect in a manner consistent with the prospect's business needs and level in the company.

Historically, TES tools use a relational database to store either "aggregatable" data (repeating data records), or "related data points." An example of aggregatable data would be a retail store database full of sales transactions. An example of related data points would be an order entry database: one customer has many orders, each order many items, each item many data points (price, size, color, etc.). Although relational database management systems ("RDBMSs") can represent complex relationships between types of items or objects, they are frequently overlooked for their ability to represent relationships between concepts and ideas. For example, an animals database may link predators to prey through a "many-to-many" relationship table. In general, however, TES databases are typically used to store "business facts" rather than to represent linked ideas. For this reason, current TES tools are relatively rigid and have low levels of "intelligence". Thus, current TES tools do little to help a technology salesperson in the task of appropriately positioning a product or service given a customer's unique and industry-specific business requirements, their key concerns/objections, and the known competitors.

The vast majority of sales opportunities are lost because of inappropriate product positioning and incomplete or inaccurate competitive differentiation. Features that are not applicable to a customer's requirements may distract decision-makers and even provide an opportunity to raise objections. For example, many deals fail because what a vendor calls a feature may actually be a liability given the idiosyncrasies of an organization. Highlighting competitive weaknesses that don't apply in a particular industry will certainly not sway (and may potentially alienate) educated decision markers.

The static documents produced by current TES tools fail to address the ever-changing, situational characteristics of the sales context. Generic product marketing literature, competitive matrices, competitive white papers, standard presentations and other static selling tools are highly imprecise and often potentially damaging if they lack context-sensitivity to a customer's specific situation. Automatic generation of simple web pages, sales proposals, or presentations based on a customer's specific situation exists in some products. However, typical TES products cannot dynamically generate highly context-specific correspondence, white papers, qualification tools, sales strategy worksheets, and competitive matrices.

SUMMARY

A method and apparatus for managing sales data is described. One embodiment is a software application that assists in classification, review and approval of data to be stored in a database for the use of a product supplier or seller. In one embodiment, a method includes storing a plurality of data components as groups of data components in a database, wherein the plurality of data components comprises information relating to products, and information relating to customers. The method further includes assigning a subset of the plurality of users to a content review group ("CRG"), and notifying each user in the CRG to provide input regarding individual data components of a group of data components. Input may include indicating whether data components are accurate, entering comments regarding the data components, entering edits to the data components. The method further includes receiving and storing the input, notifying a content director ("CD") to review the input. Review may include editing the comments entered, deleting the comments entered, and consolidating the input. At least one of the data components is staged to be stored in a central database, based upon the review.

BRIEF DESCRIPTION OF THE DRAWINGS

FIG. 4 is an illustration of a user interface screen for generating a product comparison matrix in an embodiment.

FIG. 5 is an illustration of a user interface screen for generating a product comparison matrix in an embodiment.

FIG. 6A is an illustration of a user interface screen for generating a product comparison matrix in an embodiment.

FIG. 6B is an illustration of a user interface screen for generating a product comparison matrix in an embodiment.

FIG. 7 is an illustration of a user interface screen for generating a product comparison matrix in an embodiment.

FIG. 9 is an illustration of a user interface screen for generating a document in an embodiment.

FIG. 14 is an illustration of a user interface screen for generating a document in an embodiment.

FIG. 17 is an illustration of a user interface screen for generating a document in an embodiment.

FIG. 22 is an illustration of a user interface screen for performing research in an embodiment.

FIG. 23 is an illustration of a user interface screen for performing research in an embodiment.

FIG. 25 is an illustration of a user interface screen for performing research in an embodiment.

FIG. 26 is an illustration of a user interface screen for performing research in an embodiment.

FIG. 28 is an illustration of a user interface screen for building documents in an embodiment.

FIG. 29A is an illustration of a user interface screen for building documents in an embodiment.

FIG. 29B is an illustration of a user interface screen for building documents in an embodiment.

FIG. 33 is an illustration of a user interface screen for performing analysis in an embodiment.

FIG. 37 is an illustration of a user interface of one embodiment of an authoring application.

FIG. 39 is an illustration of a user interface of one embodiment of an authoring application.

DETAILED DESCRIPTION

Figure 1:
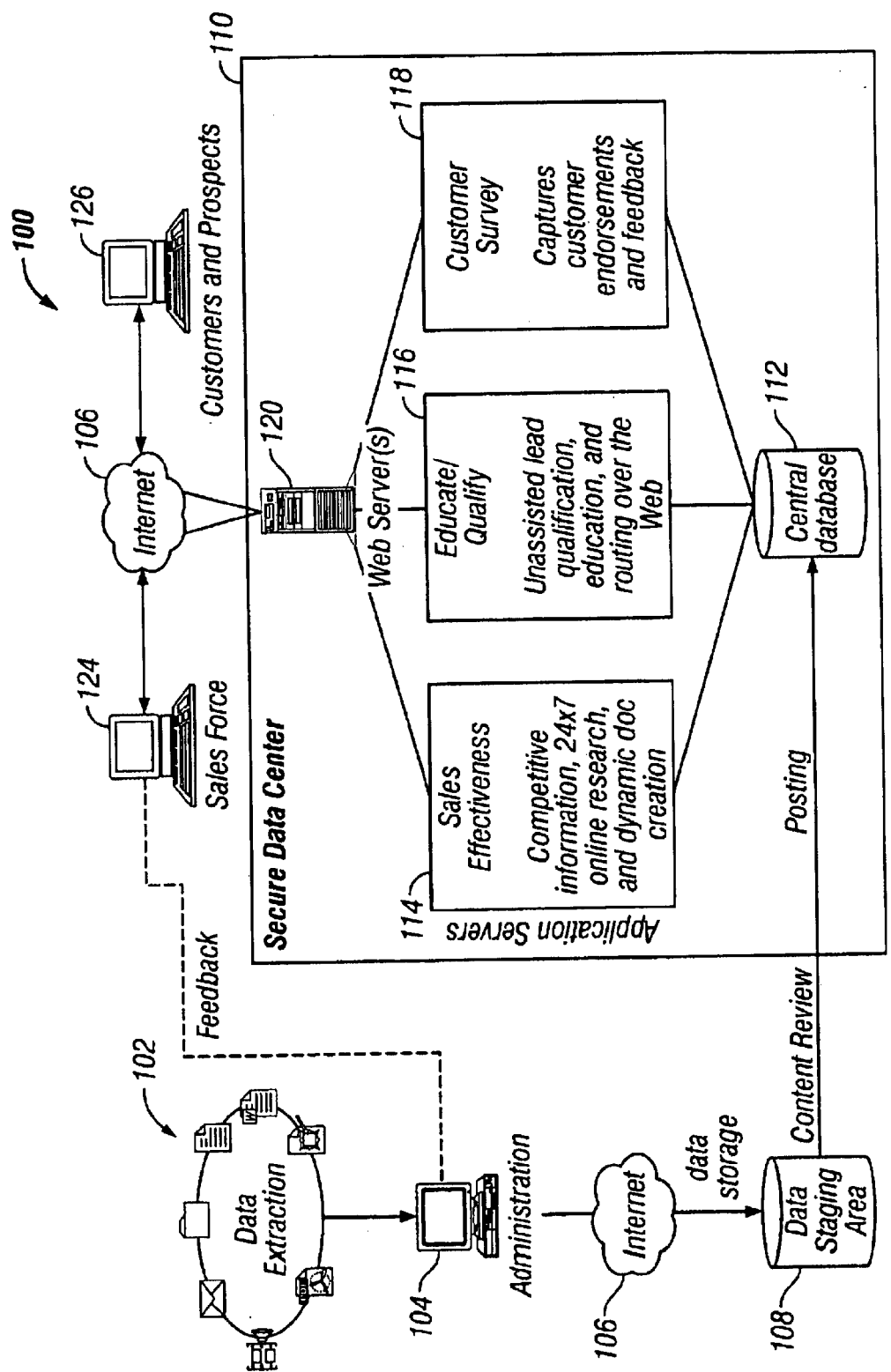
FIG. 1 is a block diagram of an embodiment of a system.

The present invention includes a method and apparatus for collecting storing and disseminating sales information. In one embodiment, several software application facilitate data collection from a variety of users within a company through a World Wide Web site. The data is classified and stored in a central database and may be accessed in many different ways by users to assist the users in selling products.

In one embodiment, the software applications include a sales effectiveness application, a website prospect education and qualification application, a customer survey application, and an authoring application. The sales effectiveness application provides access to competitive information, research, and dynamic document creation. In one embodiment, the sales effectiveness application includes various modules. For example, a compare module generates comparisons of products, such as competitive "scorecards" in the form of matrices. A generate module generates context-aware sales documents. A research module provides access to data regarding product positioning, competitive differentiation, and customer success stories. A build module allows documents to be built or responded to using pre-approved statements. An analyze module provides access to the latest market trends and usage statistics. The system thus provides salespersons with all the information they need to engage in highly competitive selling situations, and automates the creation and delivery of targeted sales collateral that appeals to each prospect.

In one embodiment, the apparatus includes a relational database management system "(RDBMS")-based data model, or central database. The software applications access and use the central database. The authoring application is used by central database content owners to populate the central database. Running on top of the central database are the sales effectiveness application, the website prospect education and qualification application, and the customer survey application.

The website prospect education and qualification application interviews Web visitors, then provides customized documents to educate them. At the same time, the website prospect education and qualification application gathers pertinent information about the prospect. The website prospect education and qualification application advises prospects on how a product or service can satisfy their purchasing requirements on their first visit to a supplier's Web site. As the user interacts with the Web browser, the website prospect education and qualification application profiles, scores, and routes the leads to the appropriate party for follow-up. The website prospect education and qualification application includes a dynamic scoring model that selects only qualified leads for salespersons to pursue.

In one embodiment, the customer survey application is used by marketing and product management departments to solicit customer feedback on a product's top features and benefits. Customer comments are staged in a central database, where they can be converted to customer quotes and case studies.

FIG. 1 is a high-level block diagram of a system embodiment 100. System 100 includes a secure data center 110 with a web server 120, application servers 114, 116, and 118, and central database 112. The application servers include sales effectiveness server 114, website prospect education and qualification application server 116, and customer survey application server 118. In this embodiment, the applications on servers 114, 116, and 118 are hosted from the secure data center 110 by a system owner. Users of the system may access the applications and the database, for example, through the Internet 106, and resultant data is "pushed" to the users through the webserver 120. In other embodiments, the software applications, such as the sales effectiveness application, may reside on a sales force computer 124, or on a customer or prospect computer 126.

Computer 124 may be any processor used by a member of a sales force. The computer 124 is used by the sales force to access the application servers in the secure data center 110 and to provide feedback to the administration computer 104. Administration computer 104 may be any processor used by an administrator. In one scenario, a manufacturer or product supplier company (a user company) uses the hosted applications on application servers 114, 116, and 118, and an administrator is an employee of the company who is tasked with administering the company's use of the system. Customer or prospect computer 126 may be any processor used by a current customer or prospective customer of the user company. The customer or prospect may access the secure data center 110 directly to extract data through a controlled access mechanism. The customer or prospect may also receive data directly from the sales force computer 124. For example, a member of the sales force may access the secure data center 110 for the purpose of generating a document that helps the customer to decide whether to buy. The document may be generated, pushed to the sales force computer 124, and sent to the customer or prospect computer 126. The document may also be generated at the request of the sales force computer 124 and pushed directly to the customer or prospect computer 126.

Input data 102 are examples of the types of data that may be transmitted to the administration computer 104 and to the central database 112. Input data 102 includes a variety of content from a variety of sources. As shown, the input data 102 may include audio files, portable document format ("PDF") files, graphics files, text files, or generally any electronic data commonly transmitted. The content may include, for example, brochures, white papers, website content, interviews with customers, etc. A particular item of data 102 may include valuable information that may be placed in several different categories. For example, a white paper may have details about the strong or weak points of particular products, details about a particular customer's unique needs, and other useful information. In one embodiment, certain system users with administrative responsibility and pertinent skills and experience, such as marketing people in a user organization, review the input data 102 using an authoring software application on administration computer 104. The administration computer 104 may run the authoring software application locally or remotely to allow administration of the system. The authoring application is a client/server application used to author and manage the information in the central database. The input data 102 is reviewed and broken into smaller pieces of information at a subdocument level. The smaller pieces of information, referred to as datagems, may then be classified in a manner that is helpful to members of the organization wishing to access the information later. For example, a datagem may be classified as a customer or user requirement, as a product feature, or as a success story.

Users of the authoring application may be "owners" of database 112 content in marketing, product management, and competitor intelligence who use the authoring application to centralize corporate and product positioning messages, competitive information, and customer and analyst endorsements. The authoring application is used by content owners to enter competitive, marketing, and third-party information for re-purposing in documents and online research. The authoring application is a tool that clearly defines and links the information that the sales force needs to sell a product or solution. It is flexible enough to support various sales scenarios and methodologies, including high-level executive pitch, feature-based, one-to-one, and customer success-based selling. Advantages of the authoring application include allowing content owners to focus on providing the key information that prospects need to make informed purchasing decisions.

The administration computer 104 transmits datagems to the data staging area 108 through, for example, the Internet 106. The data may be transmitted in other ways in other embodiments. For example, the data may be transmitted wirelessly. In other embodiments, the data may be sent directly to the central database 112 from the administration computer 104. The central database stores technical definitions, benefit statements, value propositions, customer testimonials, analyst comments, and competitive comparisons for each product, feature, and selling attribute (such as corporate financial strength) that a customer or prospect is likely care about. It also stores standard sales materials, such as brochures, while papers, diagrams, video clips, self-running demos, and uniform resource locators ("URLs"). The central database 112 stores data in a manner that takes all of the essential elements of a sale into account, including the six dimensions of the selling context. The selling context consists of: the prospect's business requirements or reason to buy; the product feature/function/benefit information or service attributes; competitive advantages; market segment nuances or special industry requirements. the prospect's level in the company (e.g., technical, manager, or executive); and validating customer, analyst, and press quotes and endorsements.

In one embodiment, the sales effectiveness application consists of five modules: a compare module, a generate module, a research module, a build module, and an analyze module. Using a World Wide Web ("Web") browser, salespersons can use the sales effectiveness application to: compare products through dynamic competitive scorecards; generate context-aware sales documents instantaneously; research product positioning, competitive differentiation, and customer success stories; build or respond to documents, such as requests for information ("RFIs") using pre-approved statements; and analyze the latest market trends and usage statistics.

In one embodiment, the compare module includes a dynamic product comparison matrix builder. The compare module allows salespersons to instantly create matrices that take into account the prospect's industry, business requirements, key features, and the other competitors in the deal. The compare module includes a graphical user interface with icons that allow salespersons to quickly grasp high-level advantages and weaknesses, and numeric scores provide quantitative comparisons.

For example, Table 1 shows a portion of a display created by the sales effectiveness application. Scores for each of three features, or solutions, are given. A graphical symbol ("graphic") is another way of representing the relative placement of the solution in a comparison with the other two solutions. The significance of the score and graphic are explained in a short note for each solution.

TABLE 1

| Score | Graphic | Significance |
| --- | --- | --- |
| 0 | x | The solution does not support the feature. |
| 1–5 | ? | The solution has only limited support for the feature, or there's a problem with the implementation. |
| 6–10 | ✓ | The solution adequately supports the feature. |

As explained more fully below, the sales effectiveness application includes a compare module that generates an interactive, dynamic product comparison matrix. The product comparison matrix includes the subject matter of Table 1. The product comparison matrix also includes a "value chain" box that provides qualitative information justifying the surface-level scores and providing talking points. When the matrix is complete, it can be printed in various formats. In one embodiment, one format may be appropriate for an internal salesperson, showing competitive "land mines", while another format, which does not show confidential information, may be appropriate for prospects.

FIGS. 2–8 illustrate how a salesperson may use the compare module to capture a prospect's requirements and determine how the salesperson's product or products compare to those of the competition using fictitious company and product names. The base company, or user company is Softwerks, which sells an electronic mail ("e-mail") messaging system called Softmate. Softmate GO! is a complementary e-mail system for handheld devices (such as a Palm™ Pilot Organizer). The competing solutions are Verasoft Mailsuite and Unitech Message Mart, which do not offer a messaging option for handheld devices.

Figure 2:
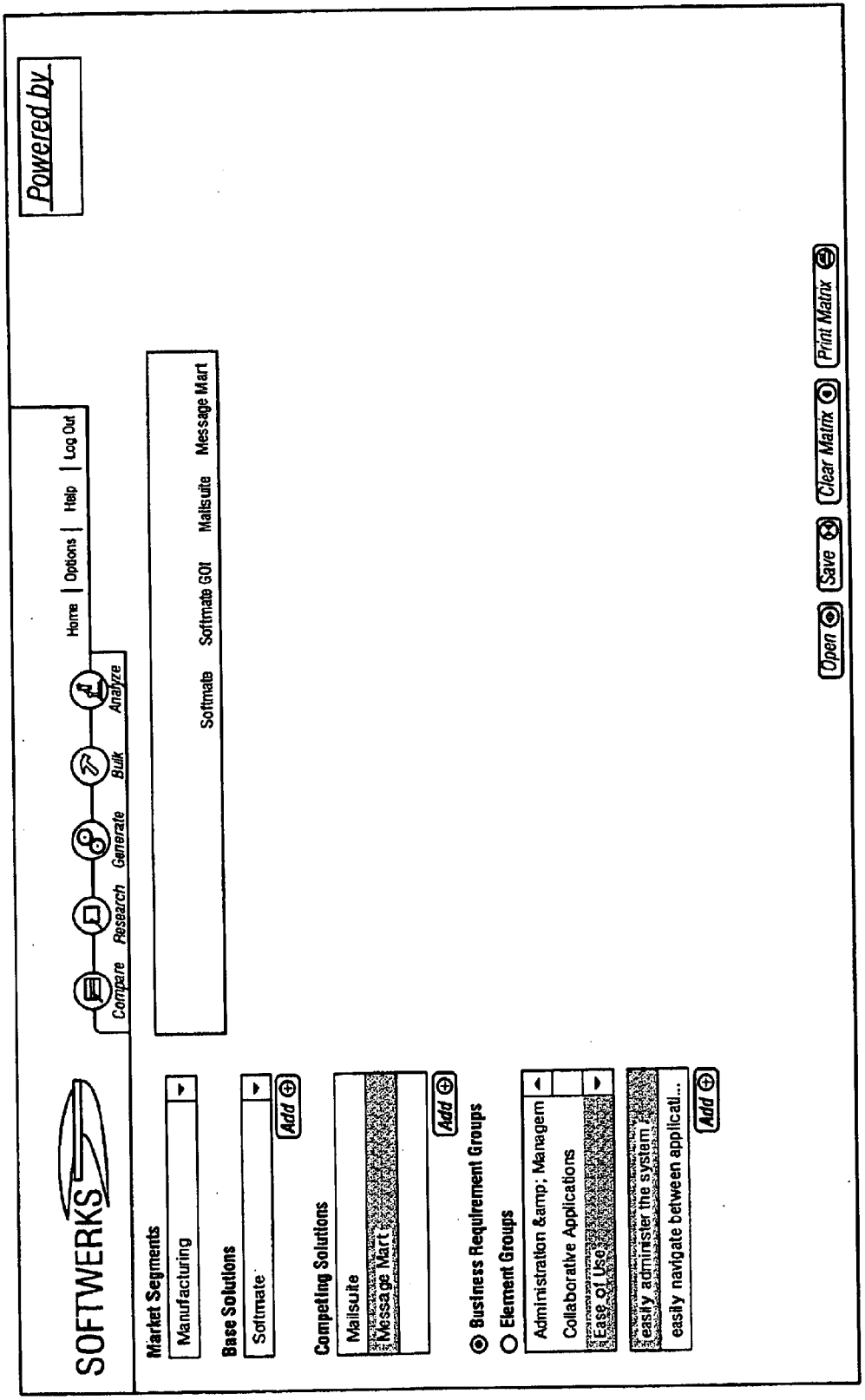
FIG. 2 is an illustration of a user interface screen for generating a product comparison matrix in an embodiment.

FIG. 2 shows an opening screen displayed by the compare module. The user may be, for example, a salesperson working for Softwerks and dealing with a particular prospect. The prospect is an IT person at a manufacturing company. The manufacturing company is interested in Softwerks products because they need to replace a cumbersome e-mail system with one that is easier to manage. They also require support for handheld devices, as many of their employees do not require the full power of a desktop computer, but still need to stay in touch with corporate and departmental messages, which are primarily communicated through e-mail.

The user may choose a market segment, such as manufacturing, that describes the prospect's business. The user may choose a base product, or solution, available from Softwerks, such as Softmate, as shown. The user may also choose competing product from other companies to which the Softwerks product or products will be compared. The use may choose a first level user requirement from a business requirements group. For example, "ease of use" is the first level user requirement chosen. The user may choose from second level requirements that are elements of the first level user requirement. For example, "easily administer the system" and "easily navigate between applications" are second level user requirements that are elements of the "ease of use" requirement. In one embodiment, the user "chooses" by "clicking" an item displayed on the screen with an electronic pointing device, such as a mouse. "Choose", "select", and "click" are used interchangeably herein when reference is made to a user interacting with a user interface. In other embodiments, the user may choose by using another computer peripheral device, such as a keyboard.

The products chosen by the user to be compared are displayed horizontally. They include two Softwerks products, Softmate and Softmate GO!, as well as two competing products from other suppliers, Mailsuite and Message Mart. In one embodiment, the number of products that can be included on a matrix is partly dependent upon screen resolution. For example, in one embodiment, four products may be displayed on a 800×600 screen, six products may be displayed on a 1024×768 screen, and nine products may be displayed on a 1280×1 024 screen.

Figure 3:
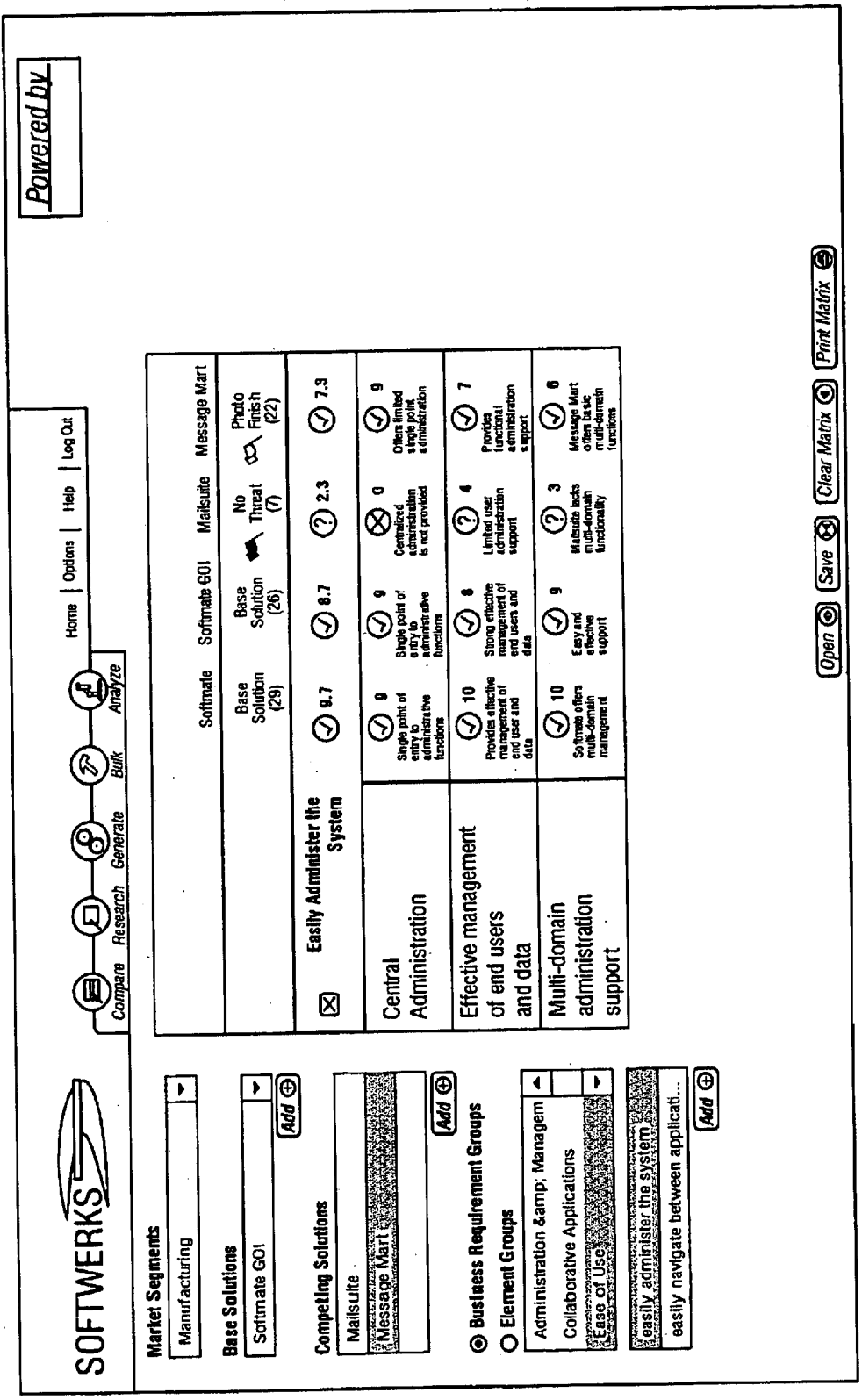
FIG. 3 is an illustration of a user interface screen for generating a product comparison matrix in an embodiment.

FIG. 3 shows one level of the dynamic, interactive product comparison matrix generated by the user's choices in FIG. 2. At this level of the matrix, based on the user requirements that were selected, the elements or features that satisfy those requirements are identified. At this level, quantitative comparisons (scores, notes, and threat flags) are visible. For example, Mailsuite is no threat to the Softwerks products, having a lowest overall score of 7. On the same horizontal line with the reiteration of the second level user requirement "easily administer the system" are second level user requirement scores associated with each of the products. Graphics are displayed with the scores. In this case the symbols indicate that the product satisfies the second level user requirement (a check mark), or may or may not satisfy the user requirement (a question mark). Also displayed with each product feature score is a short explanatory note.

Below the second level user requirement "easily administer the system" are listed product features associated with satisfying the second level user requirement. On the same horizontal line with each product feature are product feature scores and graphics associated with each of the products. For example, the product feature "central administration" is provided to some degree by each of the products except Mailsuite. Mailsuite therefore has a score of zero and an "X" with the text "Centralized administration is not provided."

Supporting qualitative information may be accessed through the "value chain". For example, when the user selects the check mark at the intersection of Message Mart and Multi-domain administration support, the value chain is displayed as shown in FIG. 4. The value chain justifies the scores on the matrix. Various areas on the value chain may be displayed by clicking on the appropriate tab (at the top of the display). For example, initially, the "feature discussion" tab is chosen, displaying a short, feature-level discussion of how the competing product compares to the Softwerks product. The value chain may also include third-party comments from industry analysts, press, and customers, links to Web pages, screen shots, demonstration files, and other supporting documents. The feature discussion screen shown includes a discussion of Message Mart's support for the element or feature, an explanation of Message Mart's shortcomings, and an analyst comment that validates the shortcoming.

When the user clicks on the "business impacts" tab of FIG. 4 the text links the lower level feature discussion to higher-level business impacts as shown in FIG. 5. When the user clicks on the success story tab, one or more actual stories from existing customers are displayed as shown in FIGS. 6A and 6B. Because the manufacturing marketing segment was chosen earlier (from the marketing segments list of FIG. 2), the customers are manufacturing companies. Under each story are any objects that may be accessed to provide more information about the particular story. For example, for Morris Manufacturing, the Morris Manufacturing logo may be accessed, as well as additional information about multi-domain support. The star visible by "King Industries Deals With Decentralization" indicates that the customer may be used as a reference by the salesperson.

Figure 7:
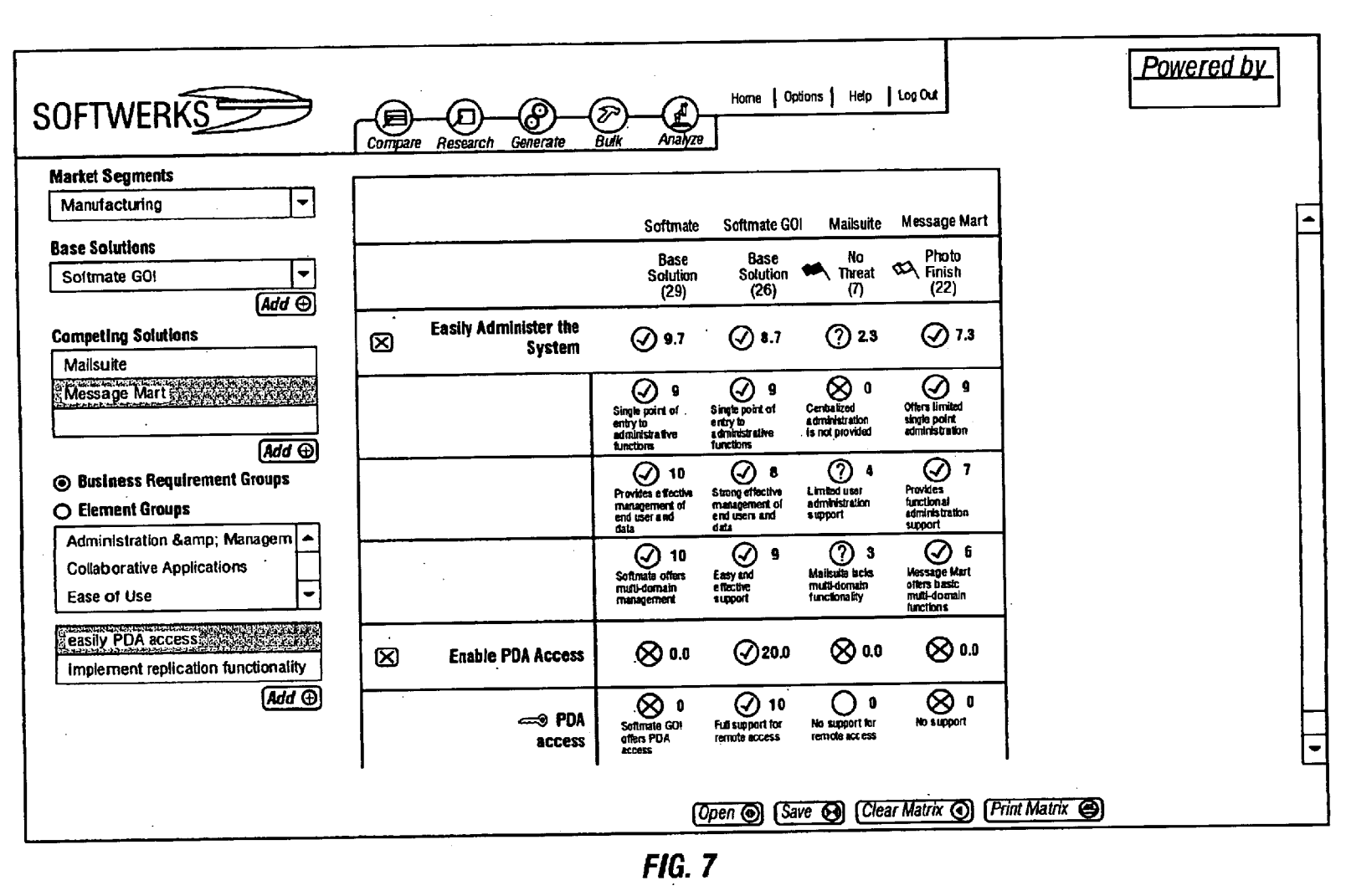

Because the product comparison matrix is interactive and dynamic, it may be changed whenever the user learns more about the prospect's needs and requirements. For example, assume the user salesperson knows that support for handheld devices is a key business requirement for the prospect. Referring to FIG. 7, when "Handheld solutions" is clicked in the business requirements group list, "Enable personal data assistant ("PDA") access" appears as a second level user requirement. Choosing "Add" adds "Enable PDA Access" to the matrix as shown. "PDA access" appears as a product feature below Enable PDA Access. Double-clicking PDA access marks the feature as key. When the feature is marked as key, the relevant score is doubled. FIG. 7 shows the matrix after the score for Base Solution's feature "Full support for remote access" has been doubled from 5 to 10.

Figure 8:
FIG. 8 is an illustration of a user interface screen for generating a product comparison matrix in an embodiment.

FIG. 8 shows a "save" screen that appears when the "save" button of FIG. 7 is pressed. As shown, the save screen allows the user to save the product comparison matrix as referenced by a project name, a company (prospect) name, a user name, a title, etc. In addition, a project description may be entered in the form of several lines of text to identify a product comparison matrix at some time after it is initially saved. When the submit button is pressed, the product comparison matrix, with all of the references to various levels of information that it contains, is saved in the central database 112.

The generate module is another module of the sales effectiveness application. In one embodiment, the generate module is an automatic, dynamic document generator. It is used by salespersons to create customized research reports, data sheets, RFIs, presentations, letters, and other documents, all taking into account the prospect's requirements. The generate module steps the salesperson through a brief interview to identify a prospect's market segment, and business and functional requirements. In a matter of minutes, the document generation engine creates highly readable, targeted documents. Various documents created may include feature and benefit statements, customer and analyst quotes, competitive comparisons, supporting graphics, and personal annotations written by the salesperson.

Figure 9:
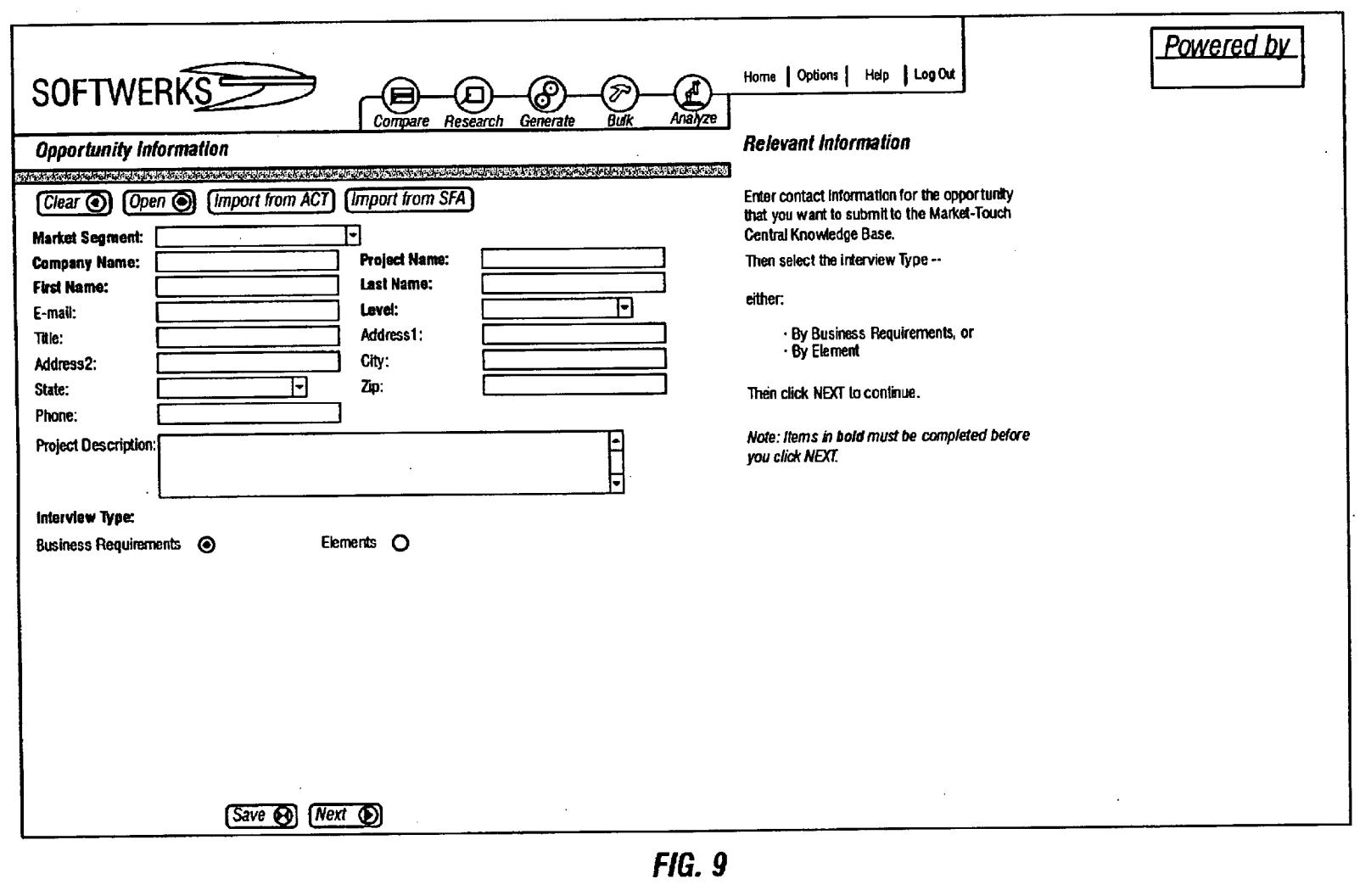
Figure 10:
FIG. 10 is an illustration of a user interface screen for generating a document in an embodiment.
Figure 11:
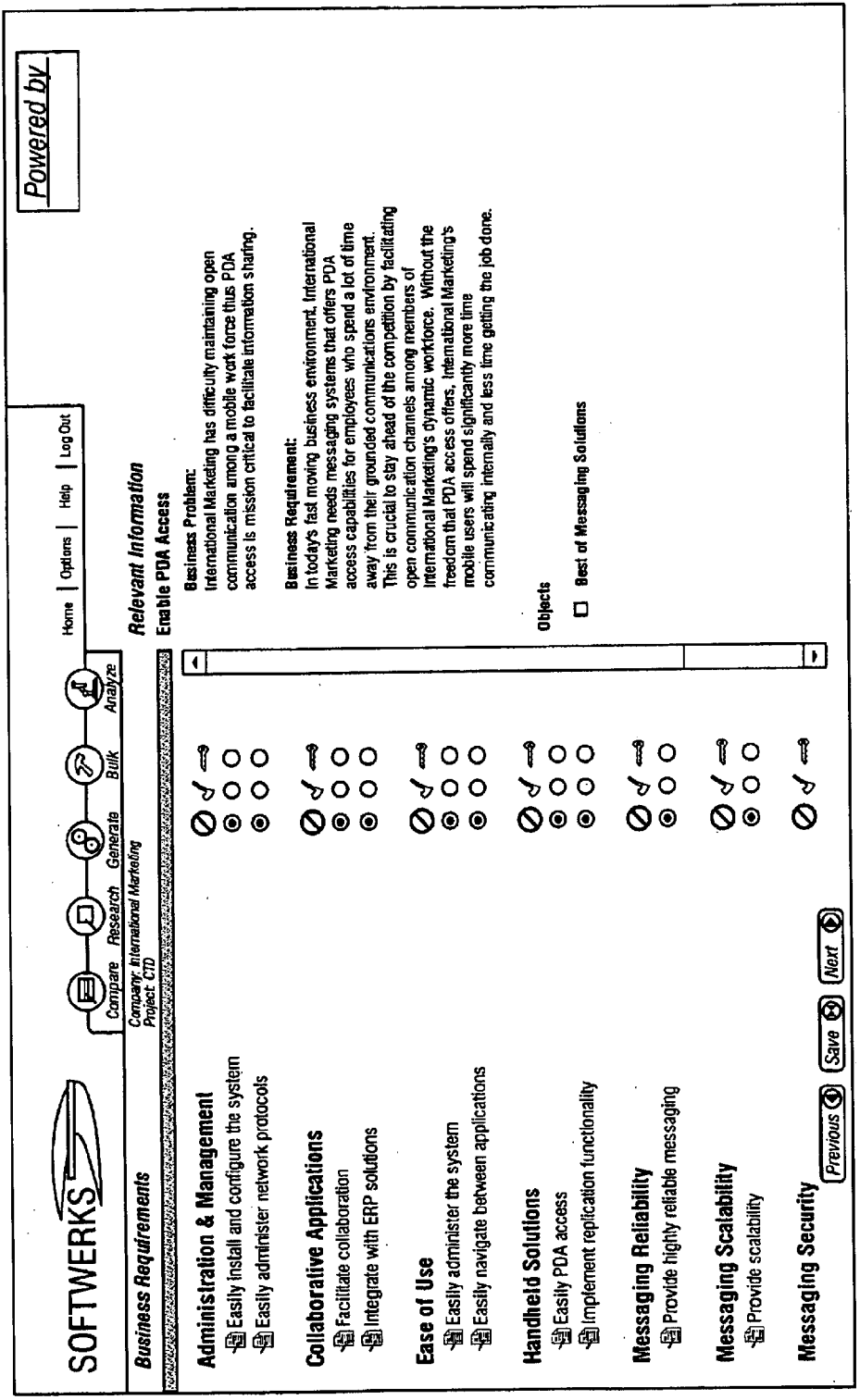
FIG. 11 is an illustration of a user interface screen for generating a document in an embodiment.

When generate (FIG. 7) is clicked on the tool bar, an "opportunity" screen is displayed as shown in FIG. 9. After "open" is clicked in the opportunity screen, contact information may be entered as it was entered when the product comparison matrix previously created was saved. Then "interview type" is entered by either business requirements or by element. When "next" (FIG. 7) is clicked in the opportunity screen, a list of saved competitive matrices appears as shown in FIG. 10. In other embodiments, competitive matrices that were previously created may be accessed by referencing any other information entered during the save process as shown in FIG. 8. An item may be chosen from the list of FIG. 10 by clicking on it. The screen of FIG. 11 then appears. All of the relevant details from the product comparison matrix are available to the generate module. For example, "Easily administer the system" and "Enable PDA access" are selected as relevant items. "Enable PDA access" is marked as a key requirement, as it was in the product comparison matrix. When "enable PDA access" is clicked, relevant information appears to the right of the business requirements list. The salesperson quickly learns that the prospect will not consider a vendor who does not provide a PDA messaging solution and why.

Figure 12:
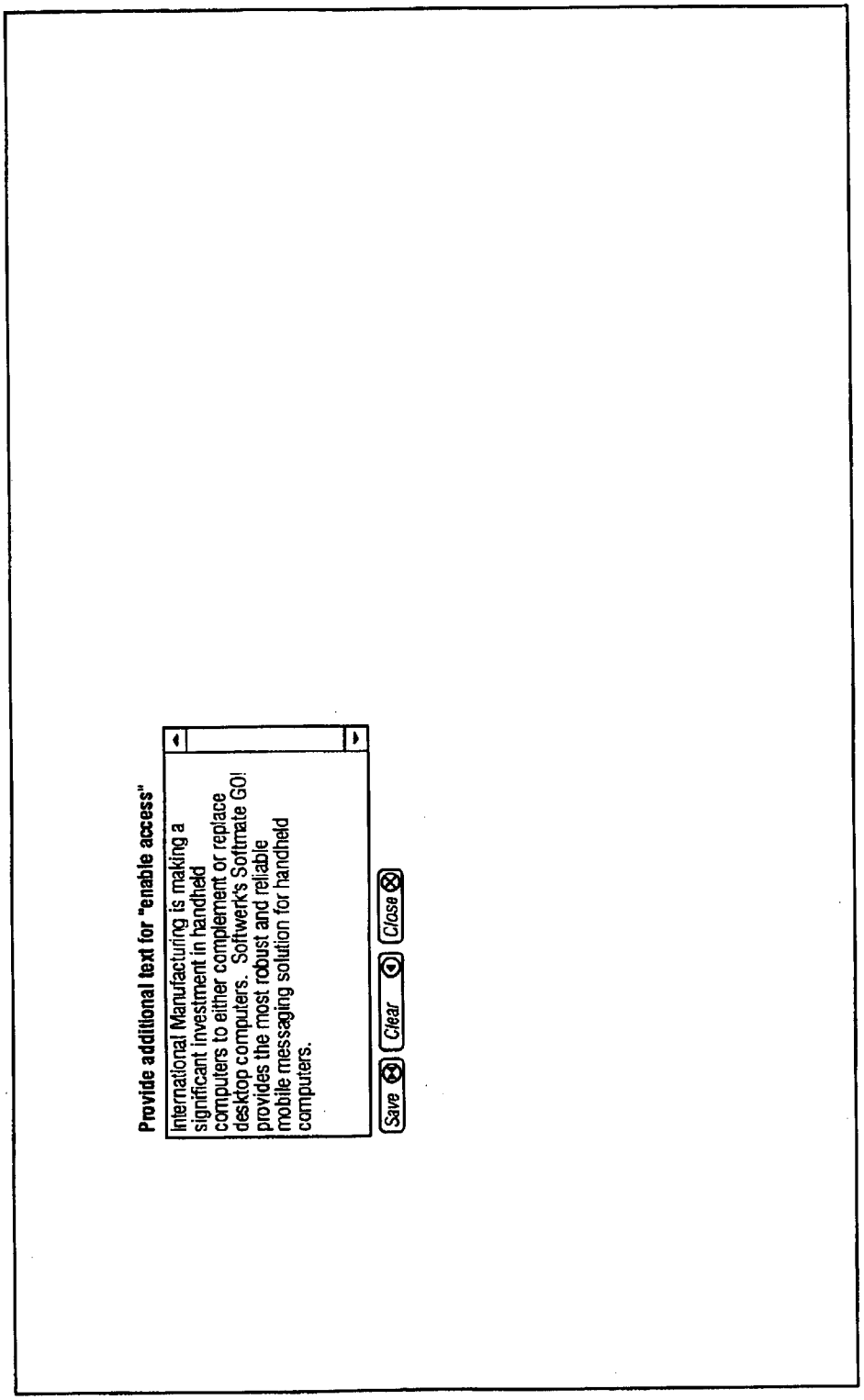
FIG. 12 is an illustration of a user interface screen for generating a document in an embodiment.
Figure 13:
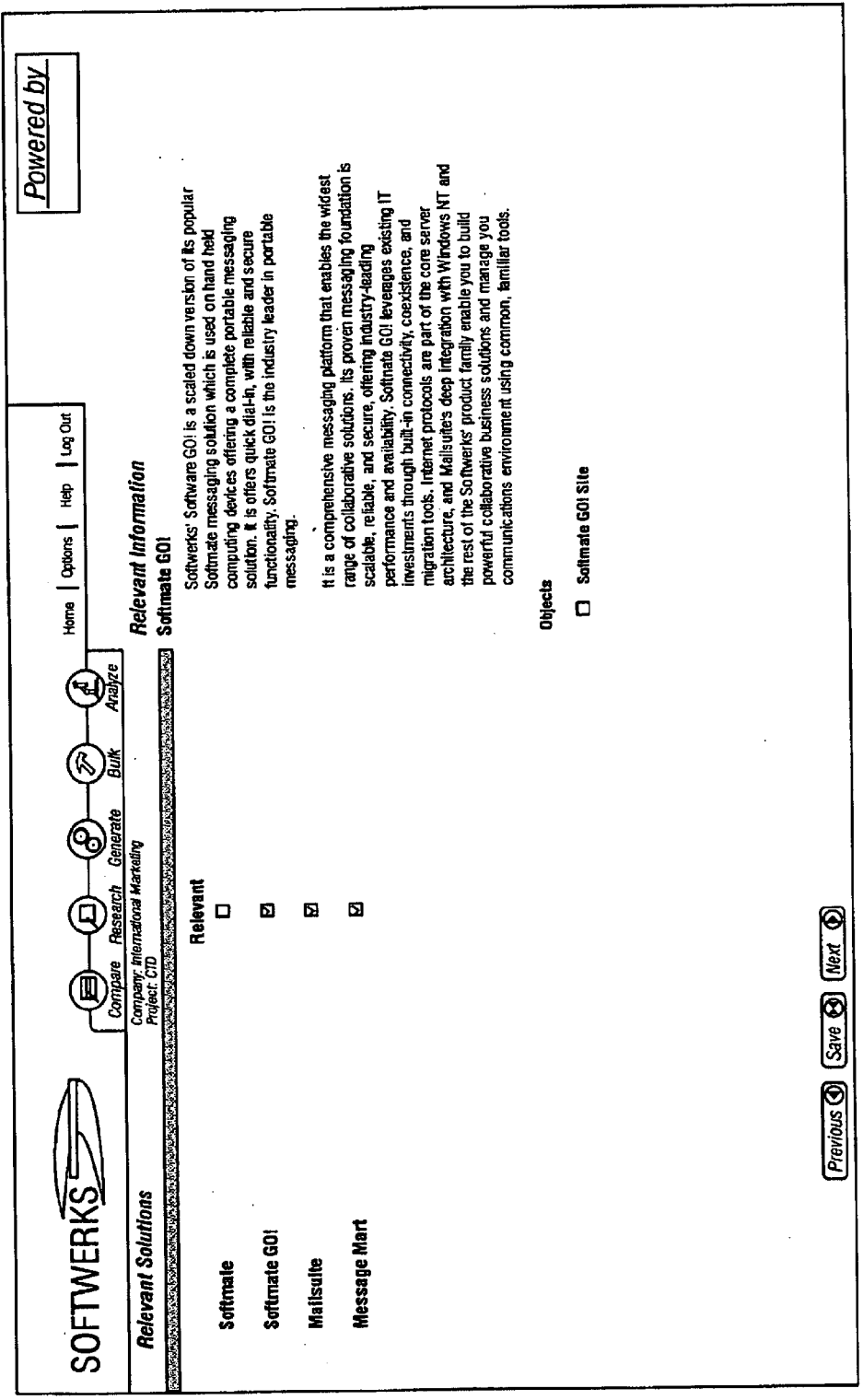
FIG. 13 is an illustration of a user interface screen for generating a document in an embodiment.
Figure 14:
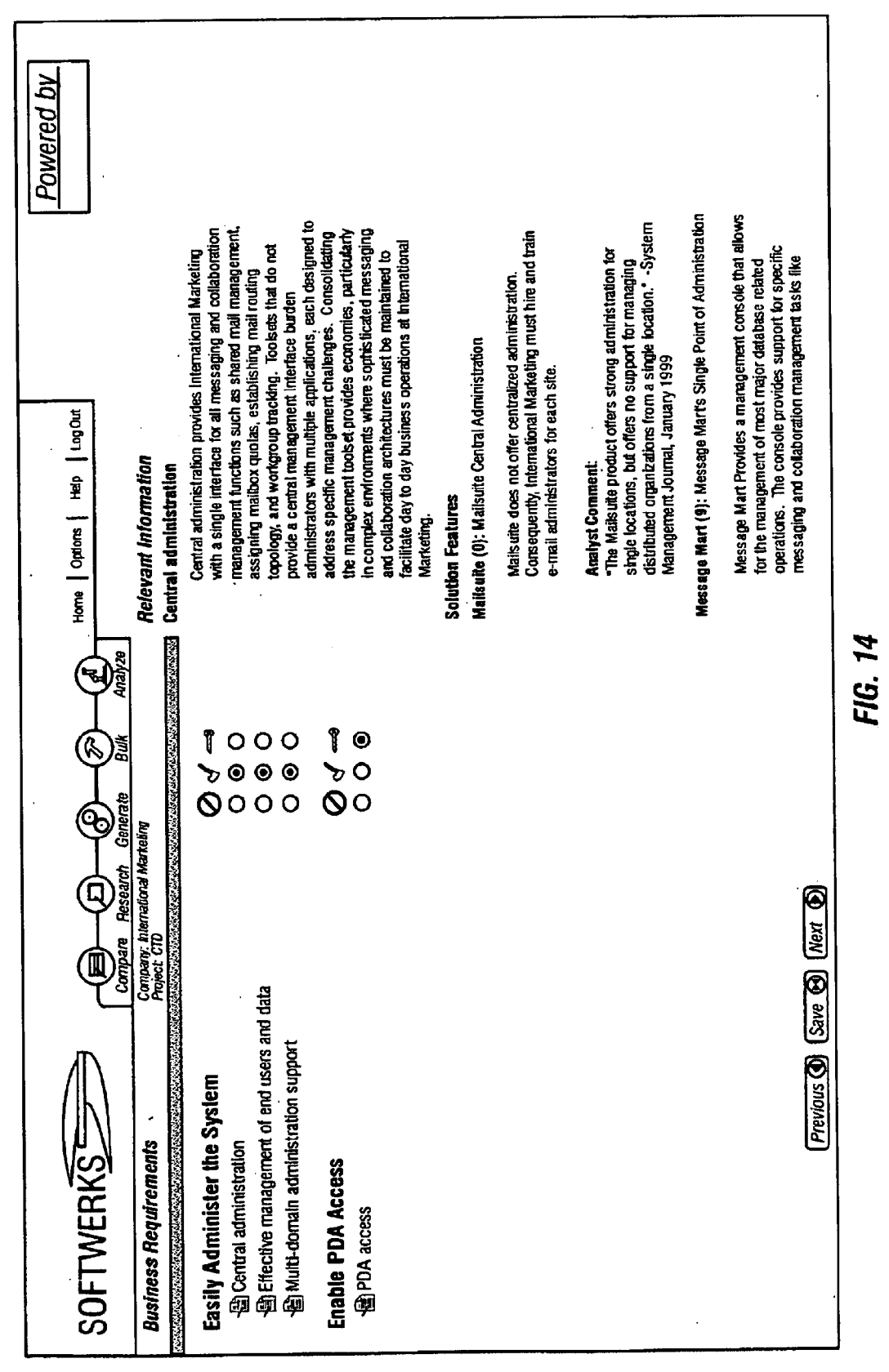

The system makes true personalization available because as salespersons work with prospects longer, the prospect's unique challenges and requirements become better known. Clicking the notepad icon next to "enable PDA access" bring up a notepad as shown in FIG. 12. A note relating to the unique fact the salesperson has discovered about the prospect may be entered in the notepad. When "save" and "next" are clicked, the text is saved and a "relevant solutions" screen appears as shown in FIG. 13. The generate module allows the salesperson to take into account the competitive strengths and weaknesses of his or her own offering when generating documents. The competitors for the example are already known from creating the matrix. When Softmate and Softmate GO! are clicked, the relevant information for each of these products may be viewed. Clicking a product clears the check mark by the product name. Clicking "next" displays the "element importance" screen as shown in FIG. 14. The content of the screen is very similar to information on the product comparison matrix. The generate module presents the elements necessary in order to achieve the requirement. Clicking one of the links listed on the left of the screen allows the user to view a version of the value chain on the right of the screen. Requirements that are known to be key may be weighted as such. The PDA access requirement is already marked as key from the creating the matrix. The "Central administration" requirement may be marked as key by clicking on the corresponding key radio button. Notice that a score appears next to each product in the value chain on the right of the screen. Marking a requirement as key will likely change the associated score or scores.

Figure 15:
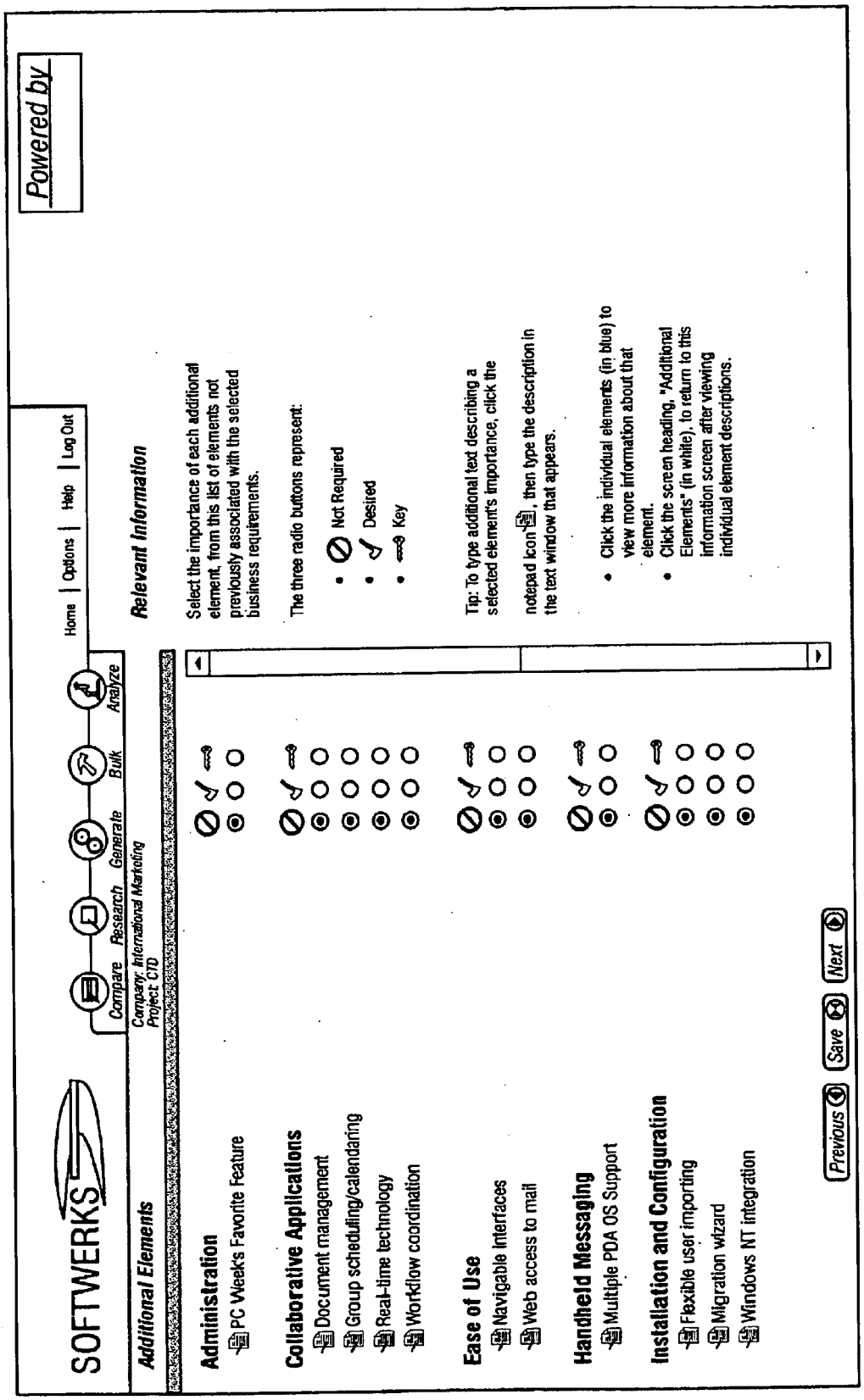
FIG. 15 is an illustration of a user interface screen for generating a document in an embodiment.

Any element that does not directly map to a purchasing requirement appears on the "Additional Elements" page, as shown in FIG. 15. The elements on this page are categorized by element groups instead of business requirements. Approaching the functional needs from two different angles improves communication and clarifies what the prospect truly needs and expects. The user may scroll through the list of elements and click any of the links to learn more about them.

Figure 16:
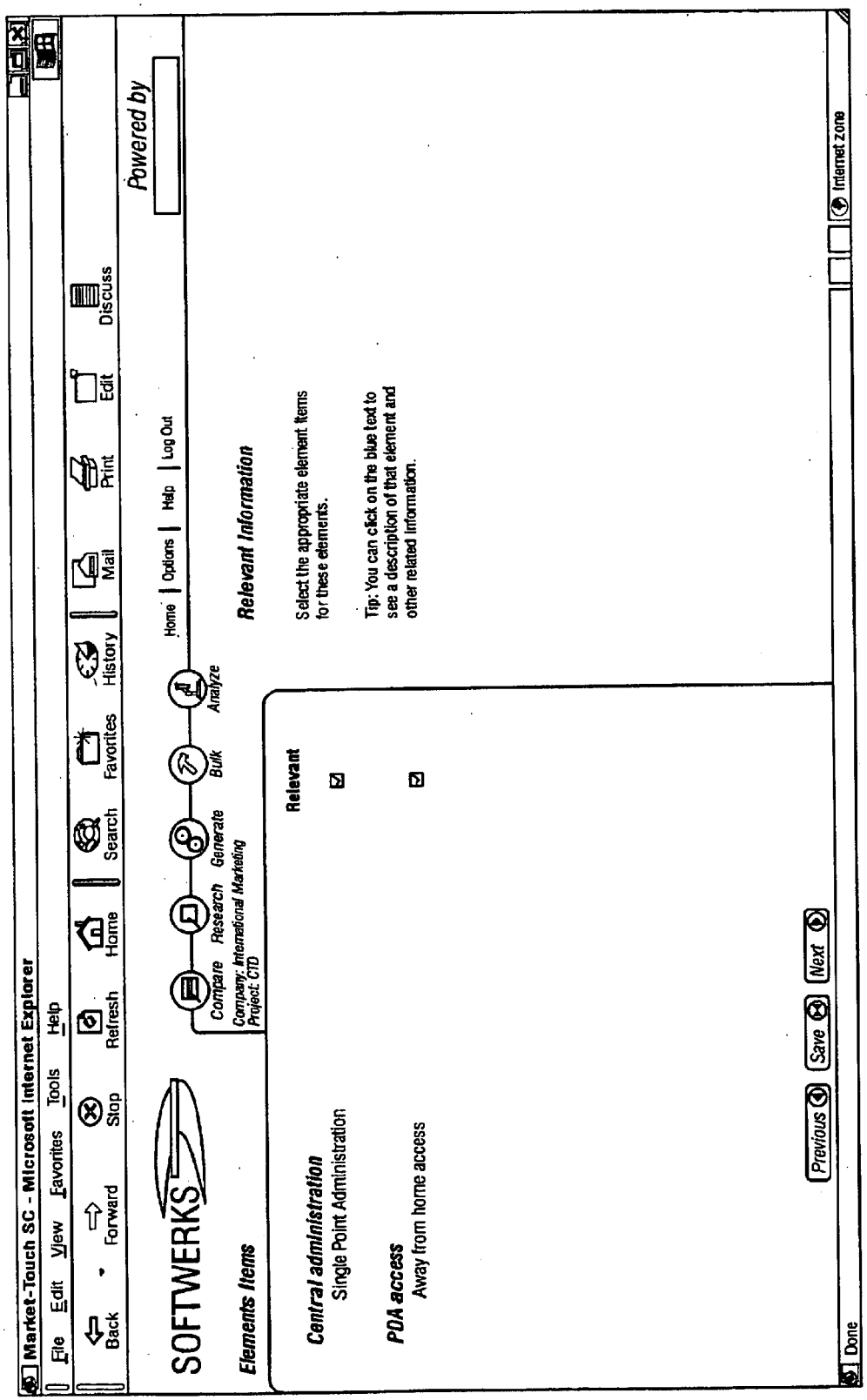
FIG. 16 is an illustration of a user interface screen for generating a document in an embodiment.

If any of the elements selected require greater clarification, the list of its low-level functional components or options appear as "element items", as shown in FIG. 16. This allows the user to pinpoint exactly what the prospect needs are, so that generated documents provide enough information to be informative, without overwhelming the prospect with unnecessary details.

Figure 17:
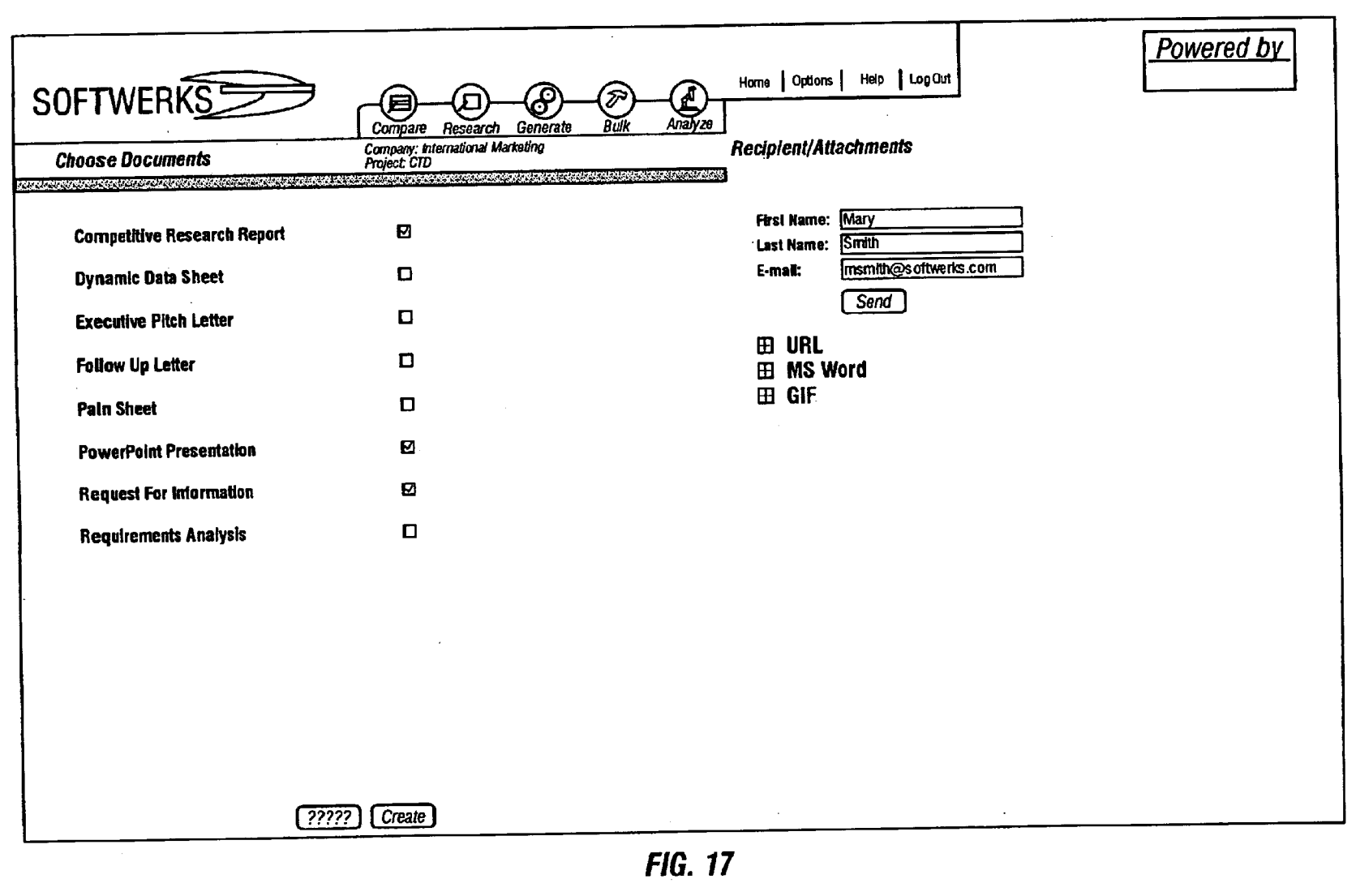
Figure 18:
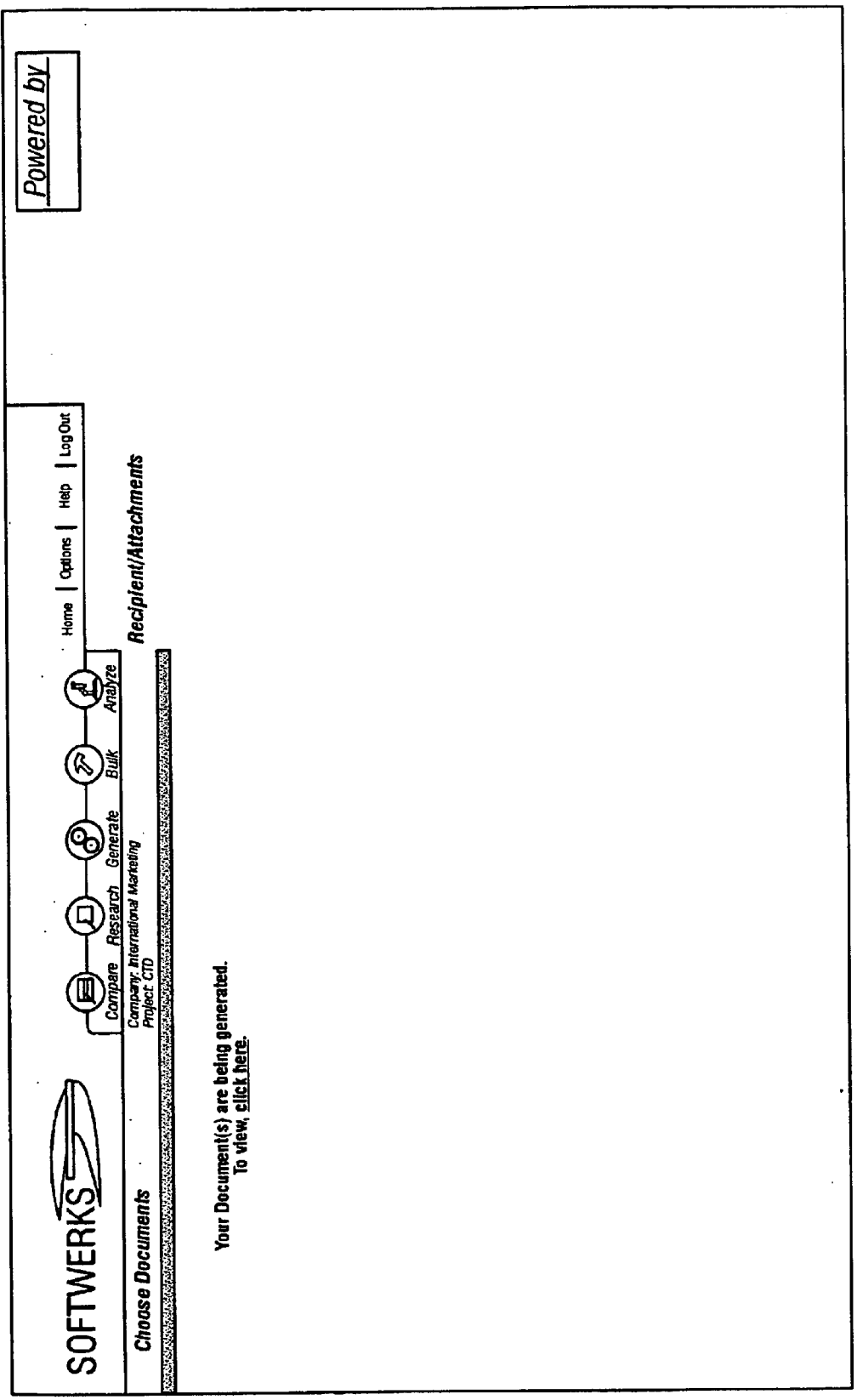
FIG. 18 is an illustration of a user interface screen for generating a document in an embodiment.

A variety of documents may be created, all of which are customized for each prospect. The documents can be sent directly to the prospect, or they can be opened for review or further editing first. In one embodiment, the documents are in standard Microsoft Office format, making it simple for the user to make any changes, and simple for the prospect to open them. In one embodiment, the following documents may be generated: a competitive research report; a dynamic data sheet; an executive pitch letter; a follow-up letter; a pain sheet; a PowerPoint presentation; a request for information ("RFI"); a requirements analysis; or a sales strategy. In other embodiment, in addition to the documents listed, the user may create any custom document that uses the information available in the central database. Clicking "next" displays the screen shown in FIG. 17. In the example shown, Competitive Research Report is selected, PowerPoint Presentation is selected, and Request for Information is selected. The e-mail button is clicked, the e-mail information is filled in, and the send button is clicked. The user may also choose to send the document to more users, as shown in FIG. 18. While the documents are being generated, the user may "click here" to view their progress. The user is then shown the home page, as in FIG. 19.

The home page is a "prospect portal." The sales effectiveness application organizes all of the documents relating to user's prospects into neat folders for quick retrieval. Each document is clearly identified in alphabetical order, which makes it easy to review the activity for each opportunity.

The research module of the sales effectiveness application is an online browse and search tool. It allows easy, secure access to corporate, product, and competitive information. It also has a rich interface to retrieve customer success stories, either by name or by matching customer profile attributes. For example, a user may find referenceable customers in a specific industry, or of a specific size.

In addition to providing a single entry point for a variety of sales and marketing information, the research module includes a feedback loop mechanism, allowing salespersons to share their field observations and anecdotes with the content owners. The research user interface screens improve overall knowledge sharing and effectively bridge communication gaps between marketing and sales.

Figure 19:
FIG. 19 is an illustration of a user interface screen for generating a document in an embodiment.
Figure 20:
FIG. 20 is an illustration of a user interface screen for performing research in an embodiment.
Figure 21:
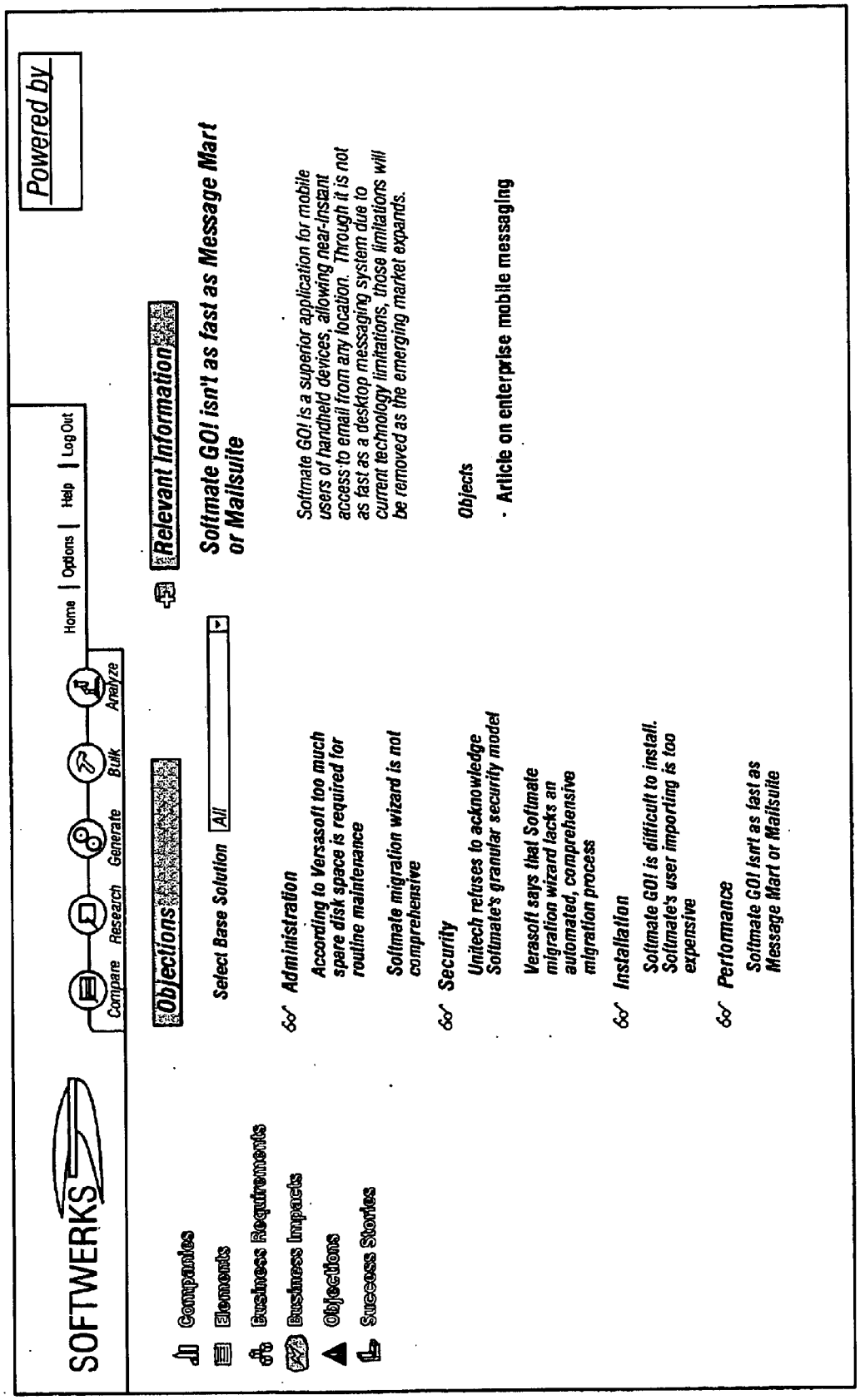
FIG. 21 is an illustration of a user interface screen for performing research in an embodiment.

The research module may be accessed from the home page (shown in FIG. 19). As shown in FIG. 20, a search may be conducted in a topic, such as "objections". When objections is chosen, and "fast" is entered, the results are one match as shown. The underlined statement 'Softmate Go! isn't as fast as Message Mart or Mailsuite may be clicked to link the user to text relating to the objection, as shown in FIG. 21. Using the research module, salespersons may access detailed information at any time over secure Web connections. Each element (feature) includes a high-level description, and also a comparative overview of how competing solutions support the element. Data history for each piece of information is also accessible. Knowing who owns the data and how old it is gives a salesperson greater confidence when sharing information with a prospect.

Figure 22:
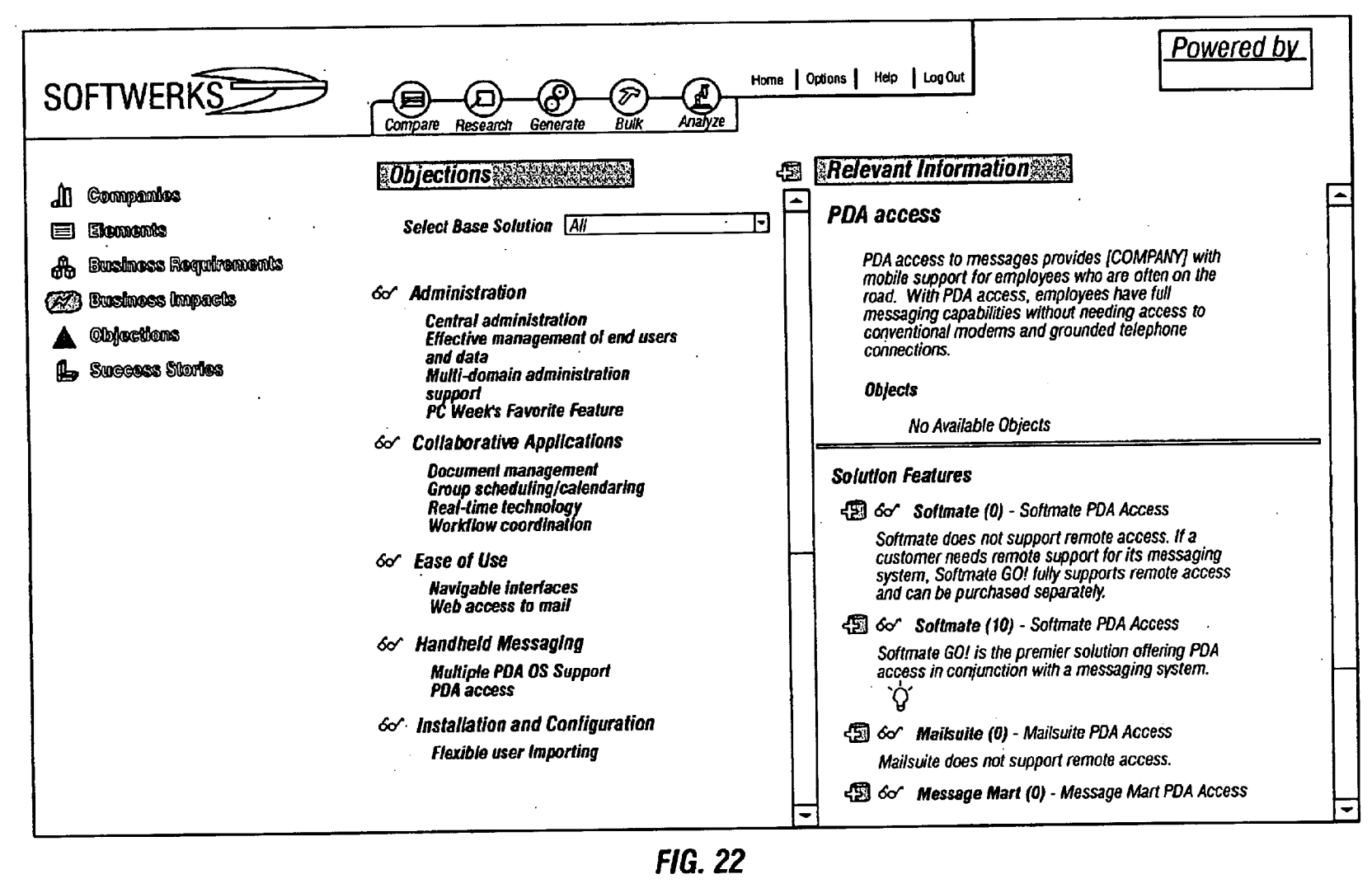

If the user scrolls down in the right frame of FIG. 21, additional relevant information appears as shown in FIG. 22. Each solution feature has an eyeglasses icon associated with it. When the eyeglasses icon next to Softmate GO! is selected, meta data information is displayed as shown in FIG. 23. The meta data may include the name of the person who entered the information, the entry date, and the last update date. Any data sources may also be entered by the author of the data.

Figure 24:
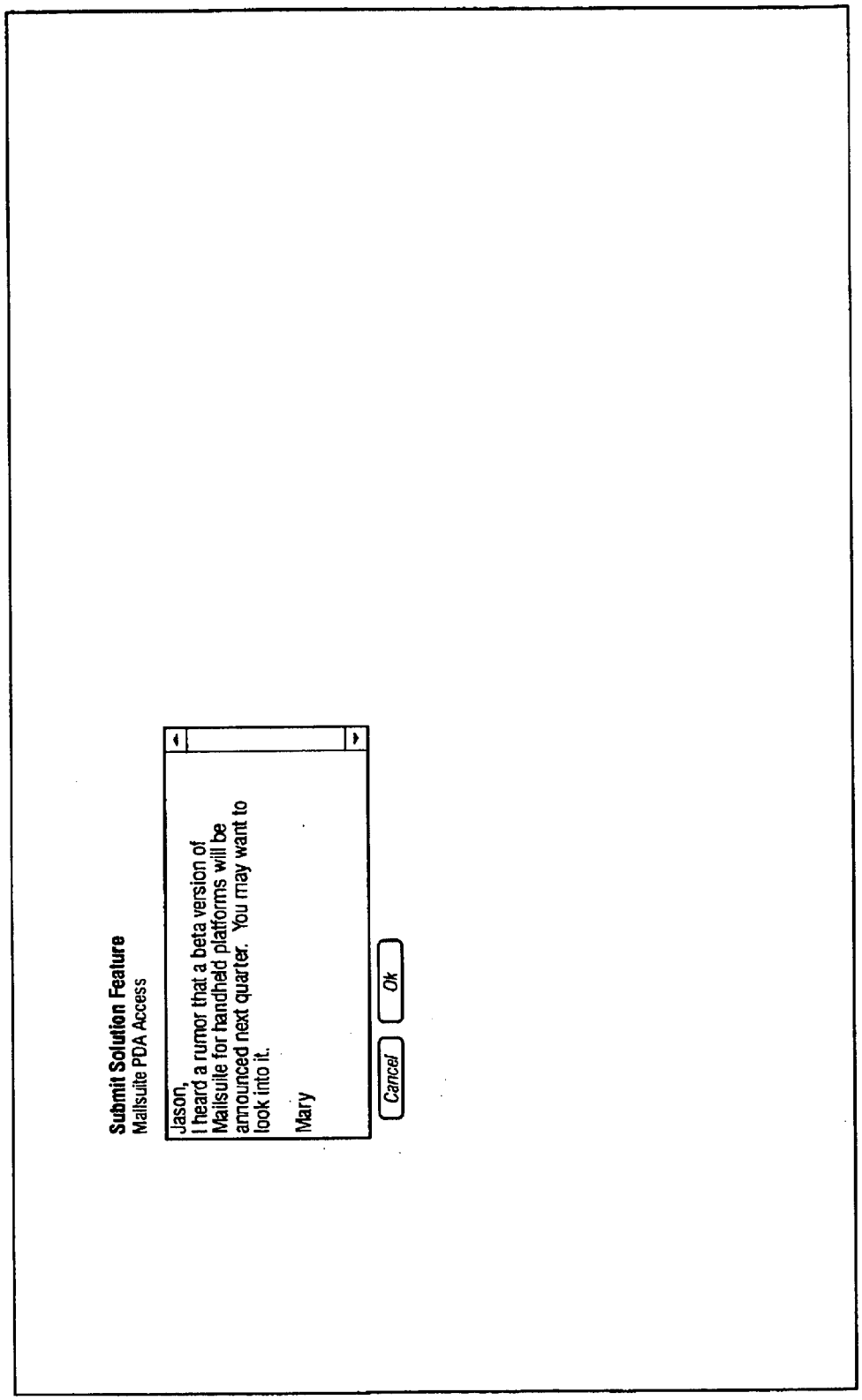
FIG. 24 is an illustration of a user interface screen for performing research in an embodiment.

Salespersons are often wonderful sources for competitive information, but their knowledge is not always passed along. Even when information is shared, it may never reach the content owner, it might be out-of-context, or may not be timely. Using a feedback loop of the research module, anyone can direct their comments back to the content owner, who can then update the system if appropriate. For example, referring for FIG. 22, it is desired to give the content owner information about a rumor that is circulating. When the database icon next to Mailsuite is clicked, data about Mailsuite may be sent to the owner of the content previously viewed, as shown in FIG. 24. When "ok" is clicked, the data is stored in the central database and becomes available to all users.

A loyal customer base is a very important company asset. Strong marketing departments devote significant resources to developing success stories and referenceable customer sites. The research module makes it easy to capitalize on successful customer relationships by making available a customer profile system. Customer success stories are searchable by pre-defined attributes, such as how a solution fulfilled a business requirement using a product, or custom attributes that the marketing department may determine, such as the size of the company. When "success stories" is clicked in the left frame of the screen of FIG. 22, the screen of FIG. 25 is display, in which a user may enter search criteria. In the example, "search by attributes" is clicked, "all" is clicked in the customer attribute list, "1000–5000 users" is clicked in the attribute list, "$200M plus" is clicked in the attribute list, and these selection are entered and submitted by clocking "add" and "submit". In response to submission of the user selections, the results of the customer success story search are displayed as shown in FIG. 26. When Abbey Mark is clicked in the valid success stories list, summary information about the company is displayed. The user may also click any of the links to view detailed information and formal case histories.

Another module of the sales effectiveness application is the build module. In one embodiment, the build module is an interactive document builder. It may be used, for example, to build or enhance documents using pre-approved statements, and to respond quickly to complex customer inquiries, such as RFIs. In one embodiment, the build module integrates with common Web browsers and with Microsoft Word and PowerPoint. In other embodiments, the build module is a stand-alone module used as a separate application. The build module stores and fully indexes common questions and answers, which are incorporated into the target document through a drag-and-drop process.

Figure 27:
FIG. 27 is an illustration of a user interface screen for building documents in an embodiment.
Figure 30:
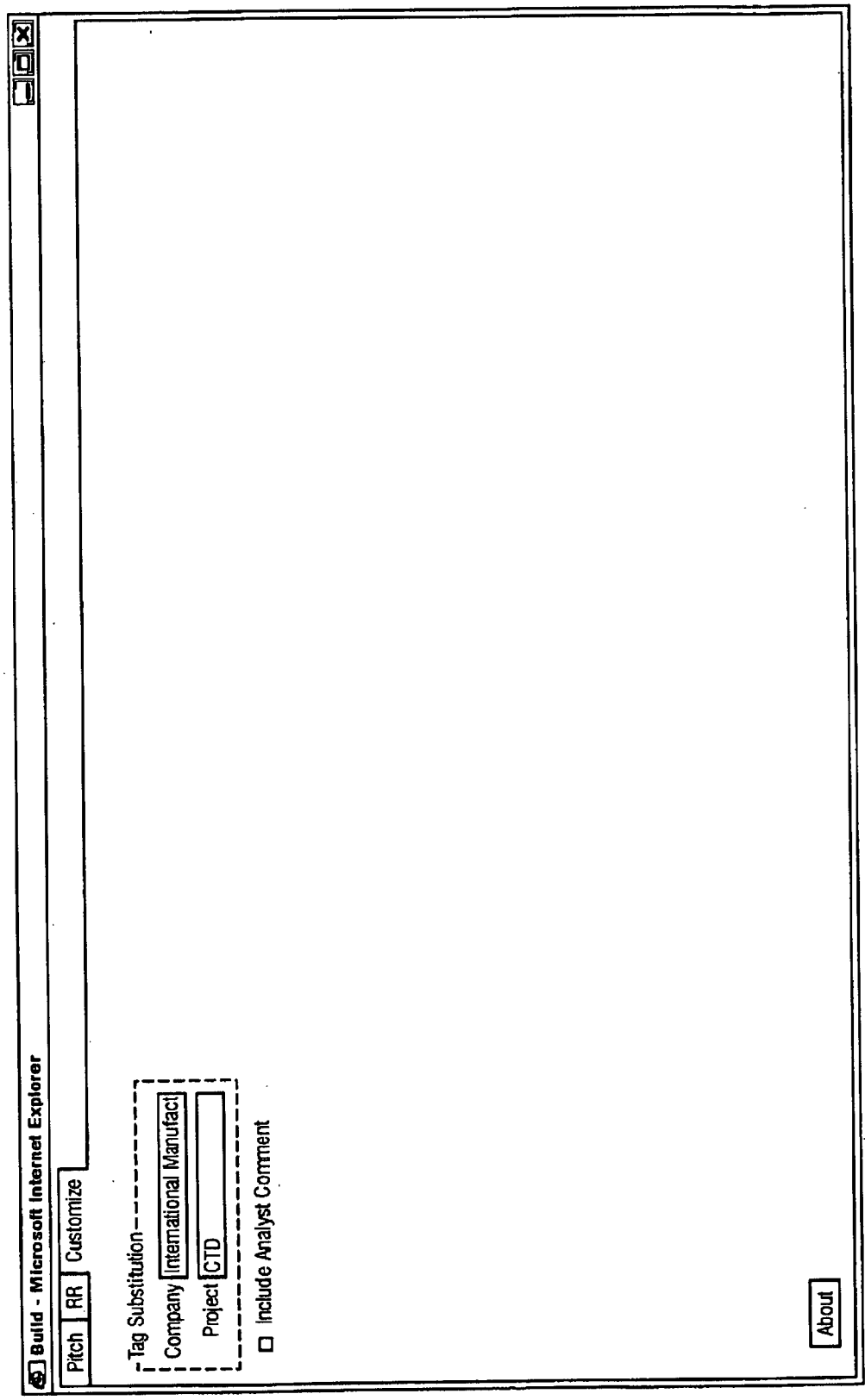
FIG. 30 is an illustration of a user interface screen for building documents in an embodiment.

An "opportunity folder" screen is shown in FIG. 27. From the opportunity screen, when "Request For Information" is chosen, an RFI template is opened. When "Build" is chosen from the browser toolbar, the build module is started. FIG. 28 shows the RFI screen that appears when the browser is minimized. FIGS. 29A and 29B show the information already provided from the central database. This information is visible as the user scrolls down in the RFI screen. Clicking a "customize" tab as shown in FIG. 30 allows the user to enter a company name and a project name. This information will then appear in the RFI.

Figure 31:
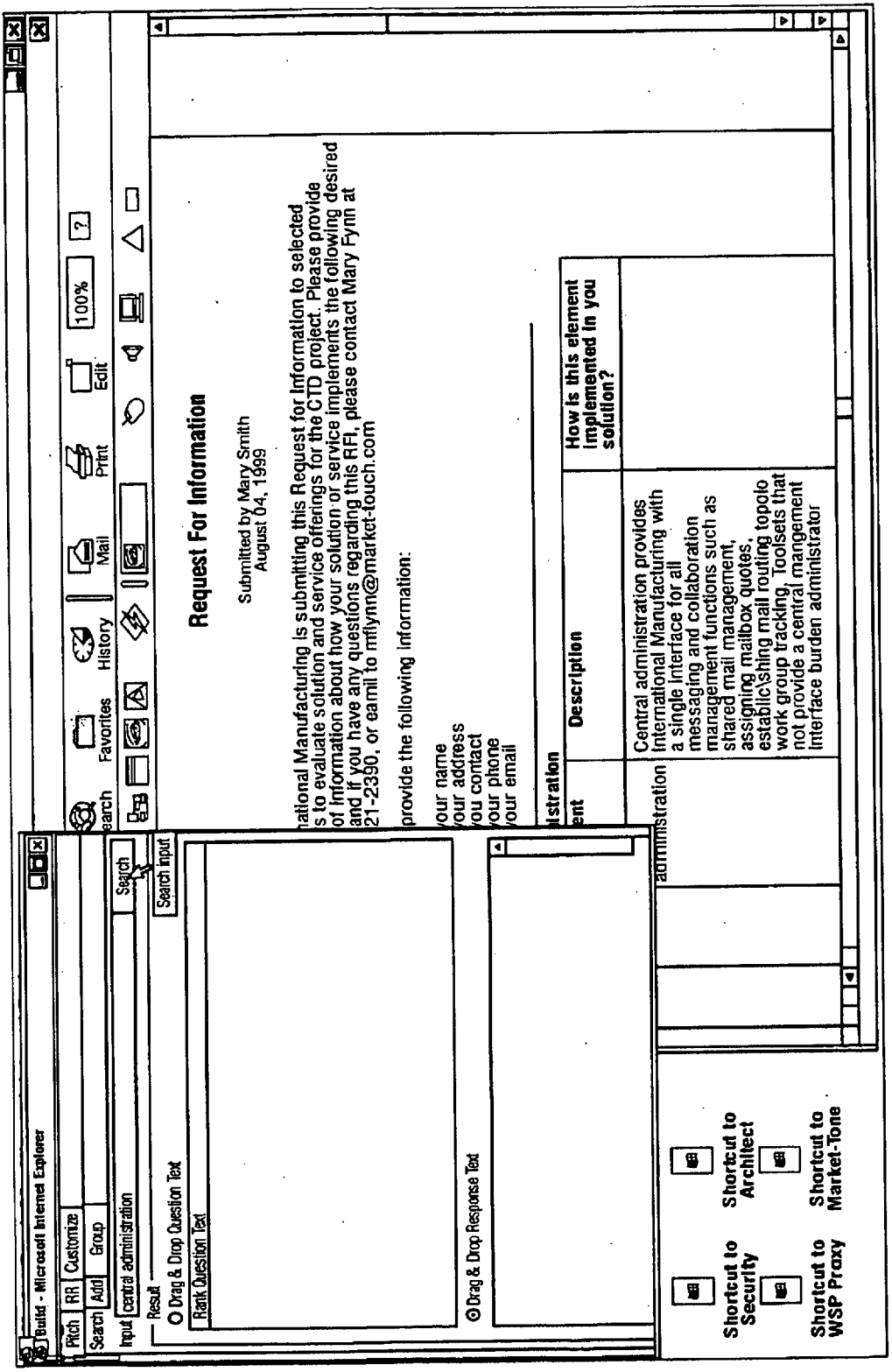
FIG. 31 is an illustration of a user interface screen for building documents in an embodiment.

FIG. 31 shows the RFI document and the build module window (browser) sized to appear at the same time. According to one embodiment, all questions and answers entered using the system are periodically indexed to enable full text searching. For example, "Central Administration" may be chosen and copied to the input box of the build window as shown in FIG. 31. When "search" is clicked, a full text search for answers is executed.

Figure 32:
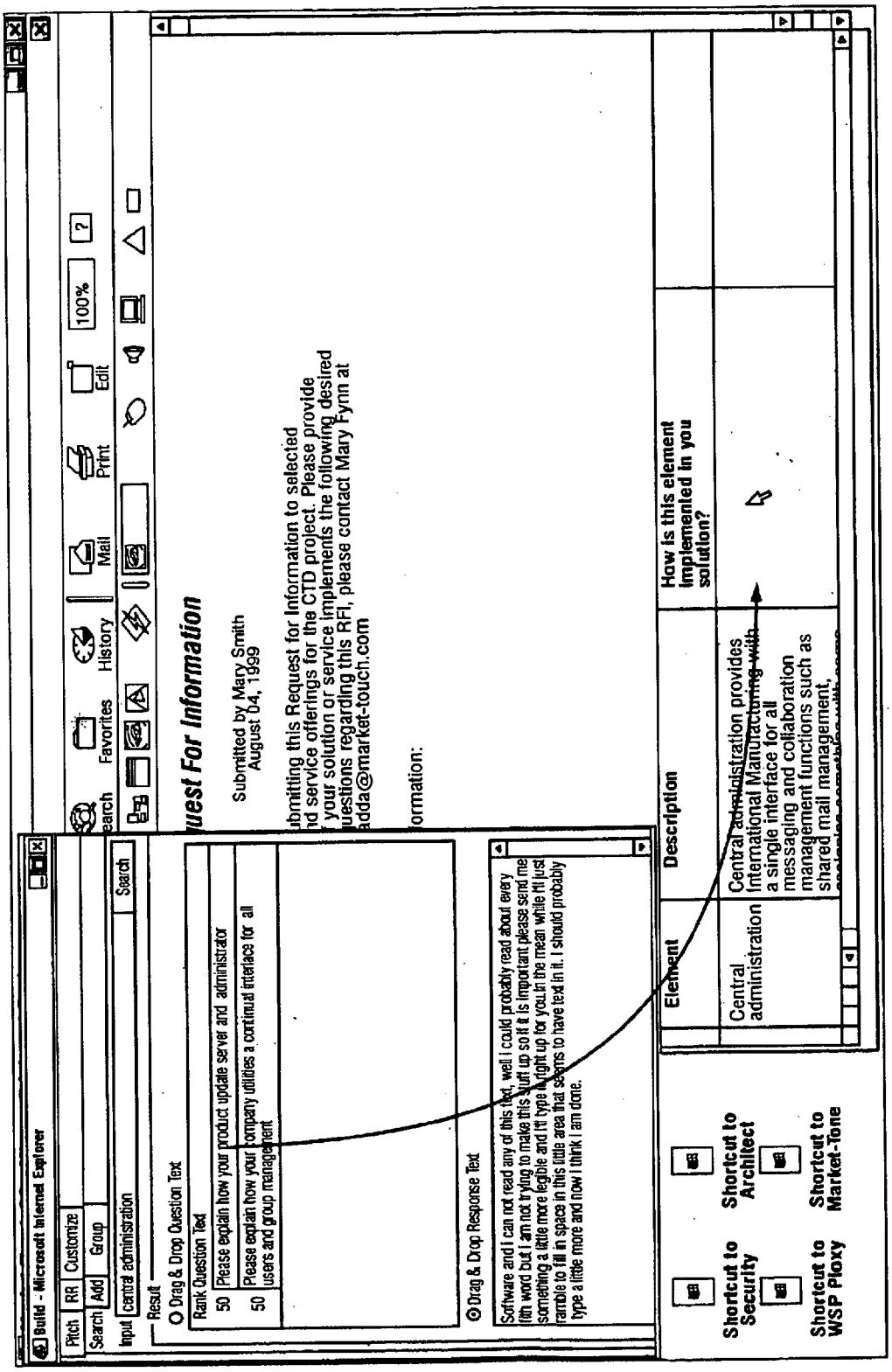
FIG. 32 is an illustration of a user interface screen for building documents in an embodiment.

RFIs are completed quickly and easily using the drag and drop interface as shown in FIG. 32. For many users, even non-technical users, dragging and dropping text is fast and intuitive. Another advantage of creating documents by dragging and dropping is that the information will be more accurate than if it were hand-entered. In addition, an administrator may review questions and answers periodically for accuracy. Referring to FIG. 32, a user may review questions and answers. The screen also displays a ranking column. In the example shown, "Drag & Drop Response Text" is selected. The text for "Does your product allow central administration?" is clicked and dragged from the build window into the answer cell in the RFI table. When the document is closed, it may optionally be saved to a local (user) computer.

The analyze module of the sales effectiveness application, in one embodiment, is a reporting system that is used by executives and managers to measure usage, analyze real-life market trends, and generate return on investment ("ROI") statistics. The analyze module clearly demonstrates who uses the system. This information may then be related to actual sales performance. The analyze module further includes pre-defined reports that challenge or confirm assumptions about the competitive landscape, customer market segments, and regional differences. The analyze module, in one embodiment, runs within a Web browser and is simple to access and use without user training.

FIG. 33 shows a screen that appears when the "Analyze" button is clicked on the toolbar. "Sales effect" is clicked in the query type frame. In this example, "sales effect" refers to the sales effectiveness application as described herein. In the screen shown, the left frame is scrolled through to show "Documents by user" in the usage reports section. The number of documents created by each salesperson is shown. The report allows a user to discover which documents are used most often, and to identify which salespersons most use the assistance application of the system.

Figure 34:
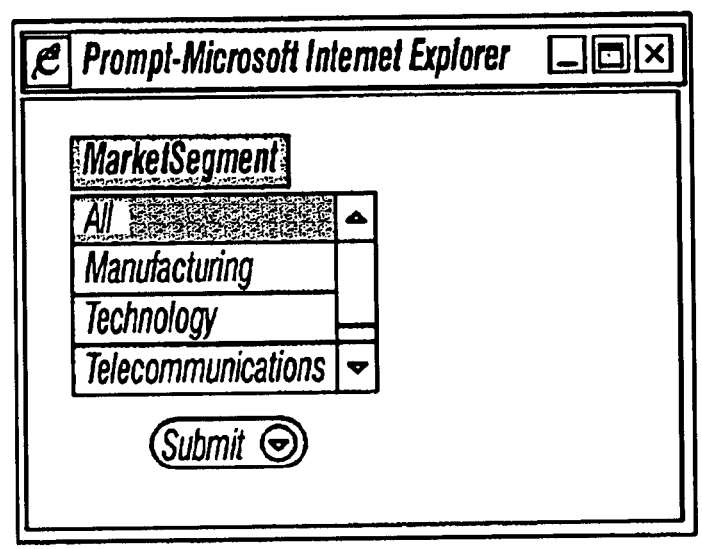
FIG. 34 is an illustration of a user interface screen for performing analysis in an embodiment.
Figure 35:
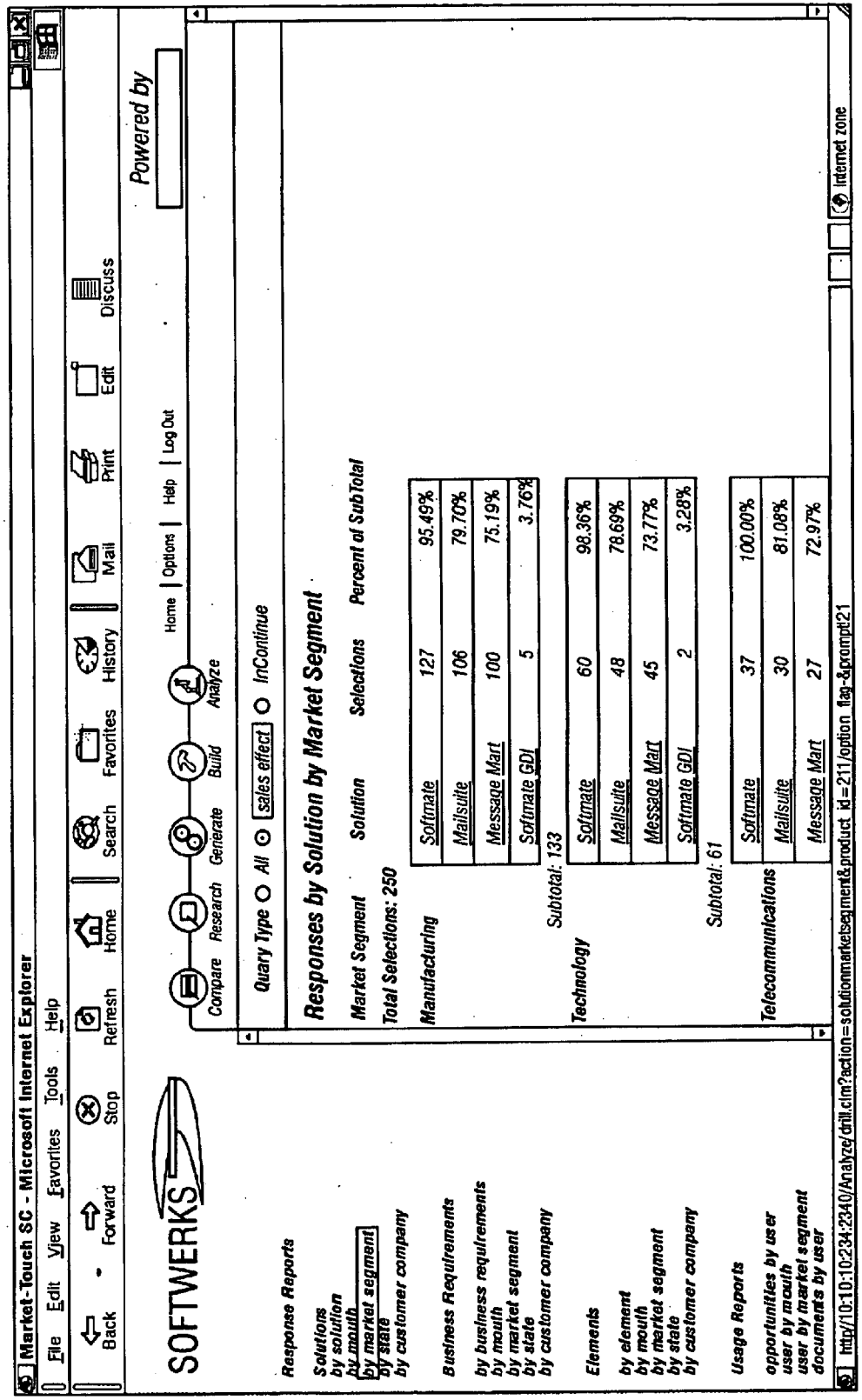
FIG. 35 is an illustration of a user interface screen for performing analysis in an embodiment.

The analyze module allows access to information recorded by the system, including where competitors have the greatest presence, and what the "hot buttons" are for different relevant market segments. The analyze module presents this information in a variety of ways. When salespersons provide their prospects with information and documents, they are also providing information that helps development, marketing, and sales management strategize regarding where to spend time and money for better competitive positioning in the market. For example, solutions by market segment may be displayed by choosing the response report, "Solutions by market segment" (upper left of FIG. 33) and clicking "All" in the prompt box of FIG. 34. The resulting analysis screen is shown in FIG. 35. Scrolling through the screen of FIG. 35, it can be seen that Mailsuite is particularly weak in the utilities market segment. The analyze module further includes reports by geographic region, which help sales managers to identify areas in which specific competitive training or reinforcements are necessary.

The authoring application, in one embodiment, facilitates the approval and audit of data in the central database 112. The authoring application allows certain users who are perceived to be content or industry experts to view new or existing data in the central database 112 and determine if the data is still valid or is accurate, and provide their individual comments and edits. For example, users of a given content review group may all view the same data that is "assigned" to them. If any of the data needs to be changed, each user can provide their edits and comments via a Web interface. A content director of the content review group may then review all comments provided by each user of the group and may edit, consolidate, or delete any comments before they are submitted to staging tables to be added to the central database 112 via an interface of the authoring application.

The following terms will be used in the description of the authoring application. Content review group ("CRG"): Users of the system having registered user IDs are assigned to a CRG, but not all system users having user IDs are assigned to a CRG. A CRG may contain one or more than one datagem groups.

Content Director ("CD"): A CD is an individual user who reviews the data received from all users in the CRG; the CD user may review all input from the CRG and edit it for final submission to the central database 112.

Datagem Group: A datagem group contains one or more data components to be reviewed by members of a given CRG. For example, a datagem group may consist of a business requirement with a customer success story, or solution feature with a customer success story. One datagem group may be assigned to one or more CRGs.

In one embodiment, the authoring application includes three components: 1) an administrative module; 2) a server component which, in one embodiment, runs on Windows NT and periodically polls the central database 112 to determine when to send e-mails to an applicable group member, and sends the e-mail, and 3) hypertext markup language ("HTML") pages that allow the group members and manager to view, audit, and approve datagem groups they are assigned. In one embodiment, the HTML pages are in ColdFusion, which is a commercial database application development tool that allows databases to have a World Wide Web interface, so that a database can be queried and updated using a Web browser. ColdFusion is available from Allaire Corporation. A ColdFusion Server application runs on the a Web server and has access to a database. ColdFusion files on the Web server are typically HTML pages with additional ColdFusion commands used to query or update the database. The commands may be written in ColdFusion markup language ("CFML"). When a page is requested by a user, the Web server passes the page to the ColdFusion application, which executes the CFML commands, places the results of the CFML commands in the HTML file, and returns the page to the Web server. The page returned to the Web server is now an ordinary HTML file, and it is sent to the user. In other embodiments, any available active server pages ("ASP") applications may be use in place of ColdFusion. For example, MS ASP from Microsoft Corporation, NetDynamics from Sun Microsystems, or BEA Net Dynamics may be used.

Figure 36:
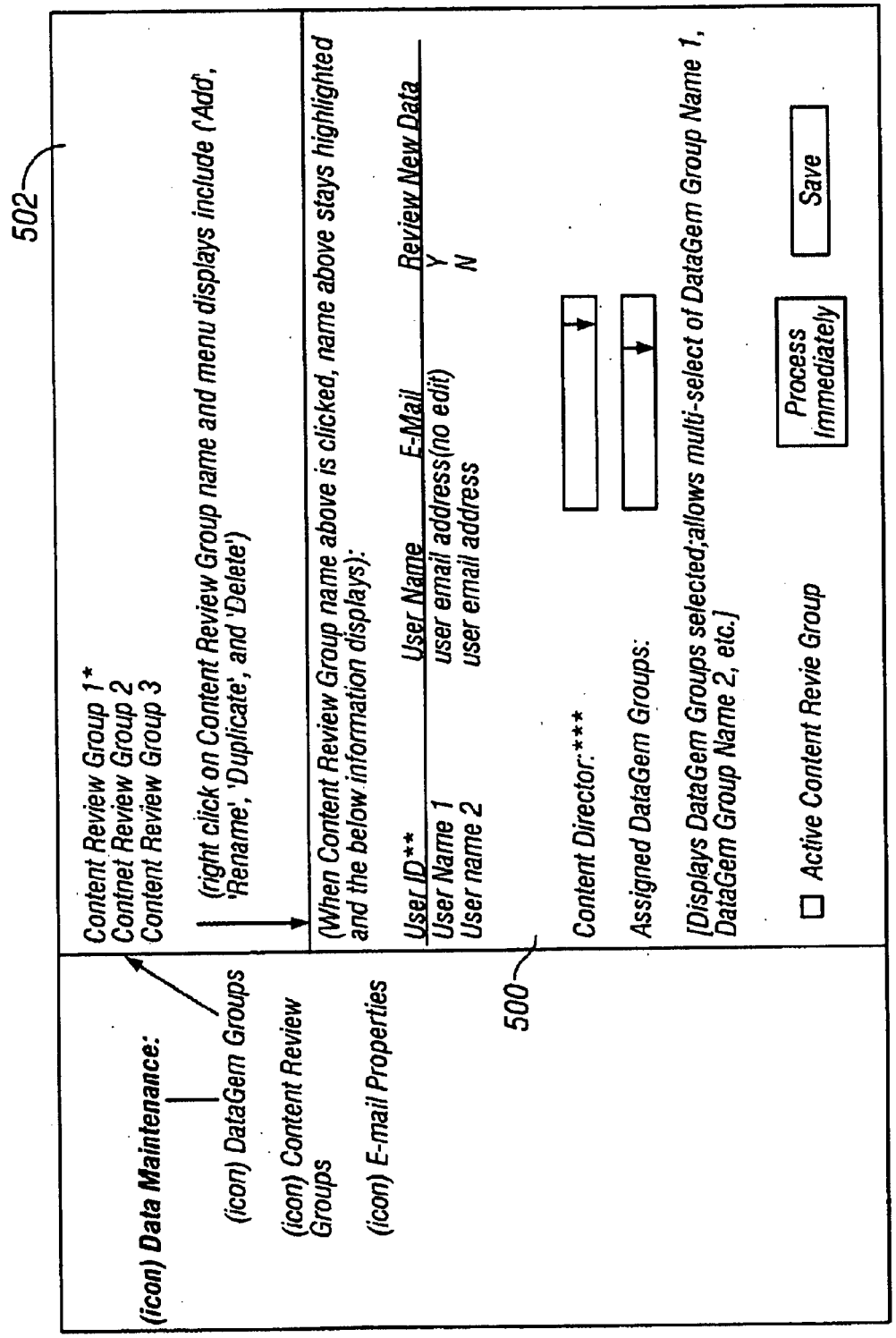
FIG. 36 is an illustration of a user interface of one embodiment of an authoring application.

FIG. 36 is a diagram of a user interface screen that allows system users to be assigned as member of a CRG. Each CRG can be assigned one or more datagem groups. When the content review group link is selected, the middle frame of a browser such as that of FIG. 35 will display the information as shown. To add a user to an existing CRG, a user may: 1) right click in the bottom right window 500 and select the 'Edit Content Review Group' menu item, or 2) select the 'Edit Content Review Group' item from the top menu bar. To add users to a new CRG, a user may either 1) right click the top right window 502 and select the 'Add Content Review Group' menu item, or 2) select 'the Add Content Review Group' item from top menu bar (menu bar such as that of FIG. 35).

When Add is selected, a list from a User table appears to allow for selection (including multi-selection) from all available users of the database. If a user is being added to an existing a CRG, or the CRG is being edited, when the user name is selected, the user ID, user name, and user e-mail (if it exists in the User table) are added to bottom window in FIG. 36. If an e-mail address does not exist, a window appears prompting the user to add the e-mail address.

If a new CRG is being created, the user is prompted to define a name of the new Content Review Group, which is added to the top window. A users list then appears, and users may be selected. When a user is selected, user ID, user name, and user e-mail (if it exists) is added to bottom window in FIG. 36. If an e-mail address does not exist, a window appears prompting the user to add the e-mail address. A new CRG may be added by either right clicking or selecting 'Add' from the menu.

In one embodiment, the CD is a required selection for a CRG. A drop down box lists all users and allows the selection of only one CD. The CD has final approval over all data input received from participants of his or her CRG and is responsible for submitting the consolidated feedback to administration staging tables. These tables can be viewed through a data repository link of the authoring application.

When the Active Group flag is set (or active), it automatically makes the CRG available for participation in the data review process. If Active Group flag is not set, the CRG is not included.

"Rename" allows a user to rename the CRG. "Duplicate" allows the user to copy all users in the existing CRG. A new CRG name must be assigned, however, as these names must be unique. "Delete" allows the user to delete the CRG from the Data Maintenance module, however, users are not deleted from the Users table. In one embodiment, user ID, user name, and user e-mail cannot be edited via a data maintenance link.

If new data has been submitted in the system using the "Add Data" icon in the research module, and these data additions are related to a datagem group that is assigned to an active CRG, then certain users may review this data. Those users for whom the Review New Data flag is set are participants for reviewing the new data additions; this new data is distributed to them via an e-mail and they can view the updated datagem group in a Web page.

"Save" allows a user to save information entered without completing all required fields. Data is not yet submitted to the appropriate administration tables. When all required fields are entered for assigning users to a CRG, each user in the CRG will receive a request e-mail when the "Submit" button is used. Required fields include at least one user ID, user Name, and e-mail address for a CRG, a Content Director, at least one datagem group, and Active status checked.

A datagem group is one or more data components from the central database which require approval or audit by a given CRG and CD. A given datagem group can be one data component, such as a business requirement, or several data components combined, such as a business requirement and success story.

Referring to FIG. 37. datagem groups may be added by either 1) right clicking in the top right window 510 where existing datagem groups are displayed, and selecting "Add datagem group", or 2) using the menu item "Add datagem group". When either choice is selected, the bottom window in FIG. 37 allows the user to enter the datagem group name, and select the Content criteria (e.g. which market segment, business requirement, or success story to be included in this datagem group). In addition, the datagem group is "assigned" to a CRG by selecting from the Assignment drop down box.

The Active datagem groups flag, when set, automatically makes the datagem group available for participation in the data review process; if the Active datagem group flag is not set, e-mail will not be sent for that datagem group.

When the "Process Immediately" box is checked, the datagem group will be processed immediately and submitted to appropriate administration tables. This status overrides audit cycle setting in the CRG link but not the Active status flag.

The "Audit Cycle" is the number of days old the datagem group must be before an e-mail is sent to the CRG. For example, if the audit cycle is seven days, the datagem group must at least as old as seven days for the e-mail to be sent to the appropriate group.

Selection of the "E-mail Properties" link allows the user to edit the e-mail properties associated with the CRG and CD.

"Reminder Days" are the number of days which must pass after the first e-mail is sent to each user of the CRG. For those users who have not yet responded, a reminder e-mail is sent to each after the number of reminder days. This setting is per user ID and may be viewed by clicking the user ID link. A default setting is seven days "Maximum e-mails" is the maximum number of e-mails that can be sent to a user in the CRG. This setting is per user ID and can be viewed by clicking the user ID link. A default is five e-mails.

"Notify after N users" indicates the number of user responses to be received before an e-mail notification is sent to the CD. A default is one user response.

All e-mail body text may be stored in a custom help file, and may be configured on a per customer basis. An e-mail with a link to the Web page containing the data review is sent to each user in the Content Review Group. In one embodiment, the e-mail request text is as follows:

To: User Name

Hello [USER NAME],

You have been selected to review competitive information on the following topics (contents of the datagem group):

ARCH_class 1: data short description

ARCH_class 2: data short description

[REQUEST_TEXT; 1 request text allowed per datagem group]

Please select the below link to review this information. Your contribution is extremely valuable in helping [BASE COMPANY] to succeed.

Thank you,

System Administrator

[URL]

This e-mail may be triggered by the following events: when system users submit data and the Review New Data flag is set for the participant in the CRG link; when a new user is added to an existing Content Review Group, that user is sent an e-mail if CRG and datagem group have Active status; Process Immediately status exists for both datagem group and Content Review Group; and, when Audit cycle is met, and both datagem group and Content Review Group have Active status.

In one embodiment, a data maintenance server on a processor of the system polls all relevant database tables in the central database 112 to determine when to send e-mails to Content Review Groups. The server compares the current date to the last modified date for each table, and if the difference is greater than or equal to the audit cycle number of days in a datagem group table, the e-mail will be sent.

A reminder e-mail may read as follows:

To: User Name

Hello [USER NAME],

This is a reminder that you have been selected to review competitive information on the following topics (contents of the datagem group):

ARCH_class 1: data short description

ARCH_class 2: data short description

[REQUEST_TEXT; 1 request text allowed per datagem group]

Please select the below link to review this information. Taking the time to review this information is extremely valuable in helping [BASE COMPANY] to succeed.

Thank you,

System Administrator

[URL]

A Review Data e-mail is sent if new data has been submitted in the system using the "Add Data" icon in the research module and the additions are related to a datagem group that is assigned to an active CRG. Those users for whom a Review New Data flag is set are participants for reviewing the new data additions. The review data e-mail may appear as follows:

To: User Name

Hello [USER NAME],

New information has been submitted to the central database by [USER NAME] that is relevant to [DATAGEM GROUP NAME]. This new information is about the following topics: (contents of the updated datagem group):

ARCH_class 1: data short description

ARCH_class 2: data short description

[REQUEST_TEXT; 1 request text allowed per datagem group]

Please select the below link to review this information. If you have any questions about this data, please contact [CD]. Your continued contribution is extremely valuable to the sales and marketing efforts of [BASE COMPANY].

Thank you,

System Administrator

[URL]

Figure 38:
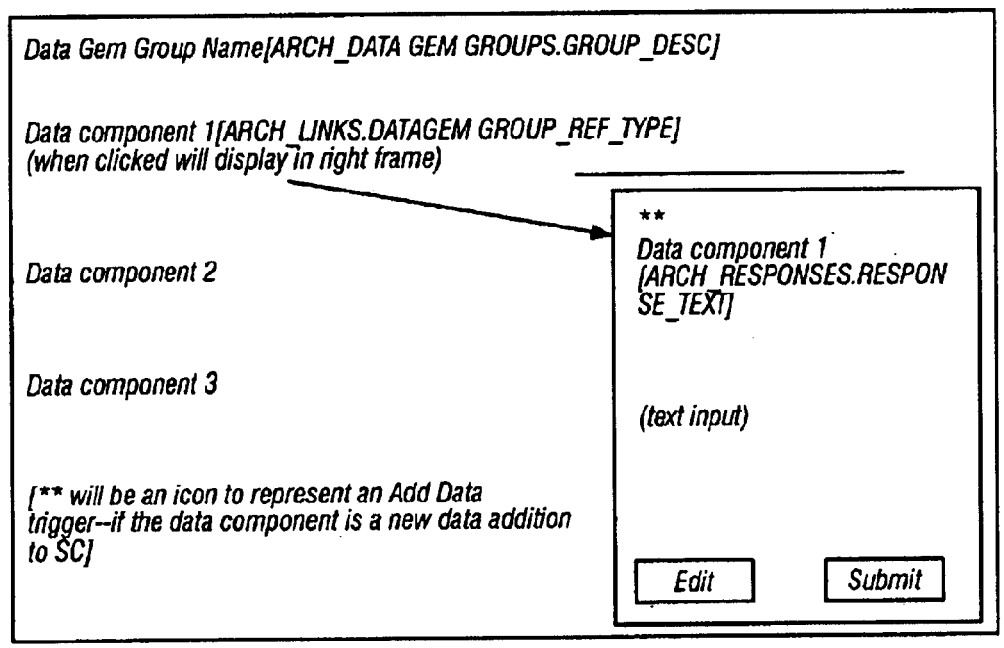
FIG. 38 is an illustration of a user interface of one embodiment of an authoring application.

Upon receiving the request e-mail, each user in a given Content Review Group will view the following Web page as diagramed in FIG. 38. The user can select each link to the left to view the data component, and if changes are required, the Edit button is selected, the user can change the text and press Submit; if data is good, the user can enter Submit to leave data as is.

All text input received from each user in the Content Review Group is sent to the Content Director for additional edits and final approval. All input received from the Content Review Group is forwarded to the Content Review modules where the Content Director can view the responses. The Content Director is sent an e-mail based upon the number of users who have responded ("Notify User number") for each user in the Content Review Group that submits comments via the Content Review Group Data Review Web page. The CD must log in to this Web site using his or her user ID and password.

The e-mail notification to the CD may state:

Hello [CONTENT DIRECTOR NAME],

[USER 1], [USER 2], and [USER 3] have submitted information for the [DATAGEM GROUP NAME] data datagem group. Click the below URL to review their input.

Sincerely,

System Administrator

[URL]

FIG. 39 shows a diagram of the first screen the displayed when the CD clicks on the Content URL.

There are four components to the Content Director's Review Web page. They are as follows: datagem groups page; content review group page, pending responses; and scratch pad.

Referring to FIG. 39, the icon corresponding to the Datagem Groups page is shown at the top of the page. This is the page that is viewed first when a Content Director accesses the Content Review page. It summarizes the datagem groups that an individual Content Director is responsible for. To the left of the Datagem Group Descriptions are radio buttons. When a radio button has been selected, the Datagem types will appear in the right frame.

An icon that is located at the top of the Datagems Groups page displays the Content Review Groups Page. On the left side of the frame, Content Reviewers who have responded to the e-mails will be listed. When a Content Director clicks on the radio buttons located to the left of the Content Reviewers, the corresponding Datagem feedback will be listed with the appropriate datagem group heading preceding the content.

If the Content Director wishes to review the Review Group members who have not responded to the requests for information, that person can click on Pending Responses. The user can then review those Review Group members who have not responded. To the right of each member name is an e-mail icon that can be selected to launch a blank e-mail that will be addressed to that Review Group member.

Figure 40:
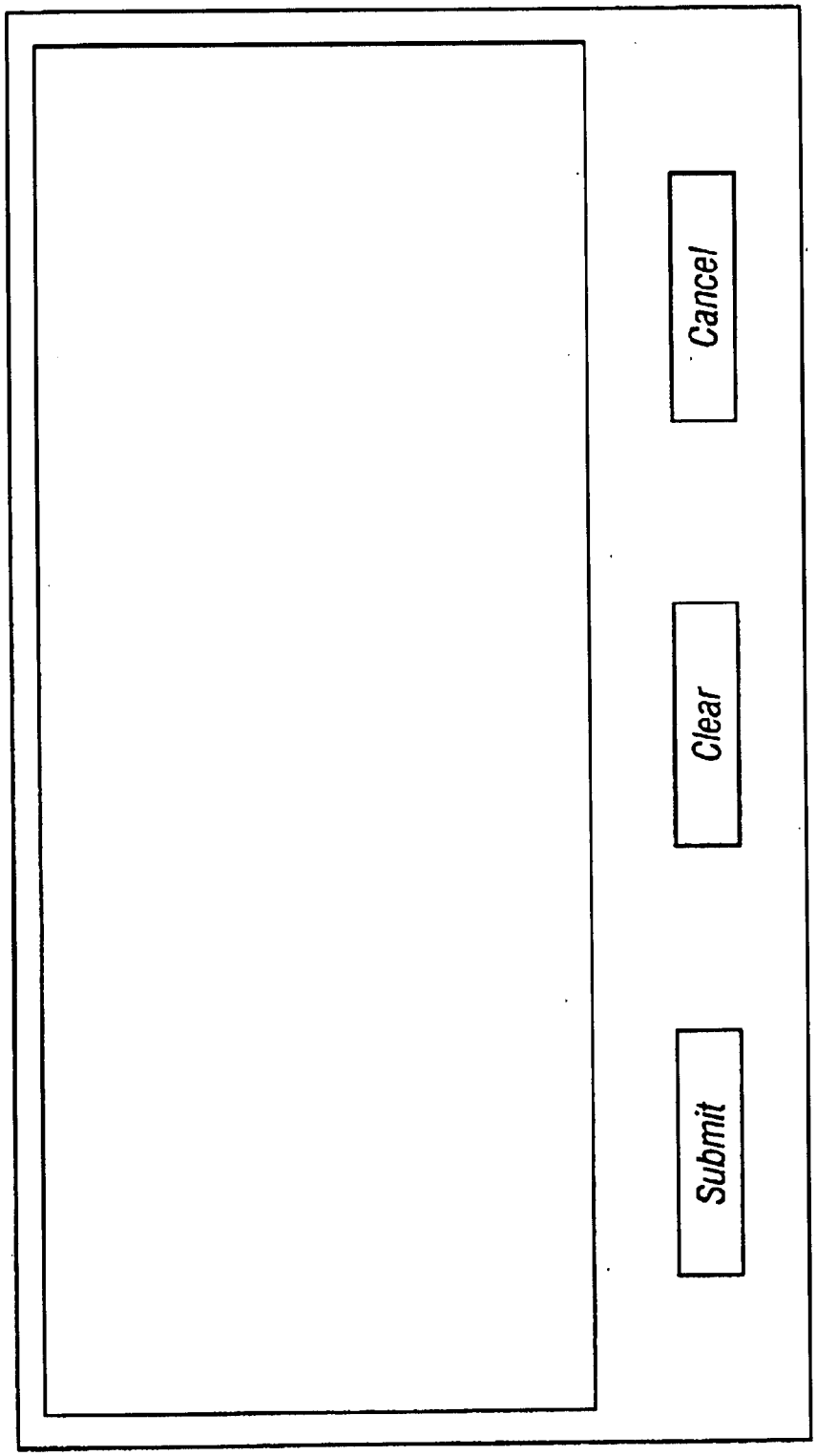
FIG. 40 is an illustration of a user interface of one embodiment of an authoring application.

On the lower right hand corner of the Review Group Feedback page there will be an icon that when clicked will launch a blank text box that can be used as a scratch pad by the Content Director, as shown in FIG. 40.

In one embodiment, the tables shown in Tables 2 through 7 are defined as shown for the central database 112.

TABLE 2

Name: ARCH_DATAGEM GROUPS
Comments: Holds one row for each Datagem created

| Field Name | Data Type | Purpose |
| --- | --- | --- |
| ARCH_DATAGEM_GROUP_ID | AUTOINC | Primary key/unique identifier for this table |
| GROUP_ID | INT | ID of group assigned to review this datagem group |
| GROUP_DESC | Varchar(35) | Group Description |
| AUDIT_CYCLE | INT | Number of days until this datagem group is old |
| REQUEST_E-MAIL_TEXT | TEXT | Request text for use in e-mail to content provider |
| ACTIVE | CHAR 1 | Y = ACTIVE; N = not active |
| LAST_MOD_BY | VCHAR 18 | Last user to modify this row |
| LAST_MOD_DT | DATETIME | Date this row last modified |
| CREATED_BY | VCHAR 18 | User who created this row |
| CREATION_DT | DATETIME | Date this row was created |
| ACCESS_LEVEL | INT | Access level needed to view this row |

TABLE 3

Name: ARCH_LINKS
Comments: Table to link datagem groups to system datagem group.

| Field Name | Data Type | Purpose |
|---|---|---|
| ARCH_DATAGEM GROUP_ID | AUTOINC | Primary key/unique identifier for this table |
| ARCH_DATAGEM GROUP_REF_TYPE | VCHAR 18 | Type of datagem group. e.g., FEATURE, BUS_REQ, etc |
| ARCH_DATAGEM GROUP_REF_ID | INT | Unique ID of datagem group. e.g., Feature_ID, etc |
| LAST_MOD_BY | VCHAR 18 | Last user to modify this row |
| LAST_MOD_DT | DATETIME | Date this row last modified |
| CREATED_BY | VCHAR 18 | User who created this row |
| CREATION_DT | DATETIME | Date this row was created |
| ACCESS_LEVEL | INT | Access level needed to view this row |

TABLE 4

Name: ARCH_GROUPS
Comments: Table that defines Content Review Groups.

| Field Name | Data Type | Purpose |
|---|---|---|
| GROUP_ID | AUTOINC | Primary key/unique identifier for this table |
| GROUP_DESC | VCHAR 35 | Description of the Review Group |
| GROUP_MANAGER | VCHAR 18 | Is USER_ID from USERS table |
| ACTIVE | CHAR 1 | Y = Active; N = Group is inactive |
| RESP_THRESHOLD | INT | Number of users to respond before e-mailing CD |
| PROCESS_NOW | CHAR 1 | Y = Server will process as soon as saved. |
| LAST_MOD_BY | VCHAR 18 | Last user to modify this row |
| LAST_MOD_DT | DATETIME | Date this row last modified |
| CREATED_BY | VCHAR 18 | User who created this row |
| CREATION_DT | DATETIME | Date this row was created |
| ACCESS_LEVEL | INT | Access level needed to view this row |

TABLE 5

Name: ARCH_GROUP_USERS
Comments: Table that defines Content Review Groups Users.

| Field Name | Data Type | Purpose |
|---|---|---|
| GROUP_ID | AUTOINC | GROUP_ID user belongs to |
| USER_ID | VCHAR 18 | Is USER_ID from USERS table |
| REVIEW_DATA | CHAR 1 | Y = User can review data. N = inactive |
| REVIEW_NEW_ENTRIES | CHAR 1 | Y = User is e-mailed to review rows in NEW_ENTRIES |
| E-MAIL_FREQ | INT | Number of days to wait for response before e-mailing again. Default is 7 |
| MAX_E-MAILS | INT | MAX e-mails to send to this user |
| LAST_MOD_BY | VCHAR 18 | Last user to modify this row |
| LAST_MOD_DT | DATETIME | Date this row last modified |
| CREATED_BY | VCHAR 18 | User who created this row |
| CREATION_DT | DATETIME | Date this row was created |
| ACCESS_LEVEL | INT | Access level needed to view this row |

TABLE 6

Name: ARCH_RESPONSES
Comments: Table holds response data from individual users.

| Field Name | Data Type | Purpose |
|---|---|---|
| ARCH_DATAGEM GROUP_ID | INTEGER | datagem group being responded to |
| USER_ID | VCHAR 18 | User making the response |
| RESP_DATE | DATETIME | Date the user generated this response |
| RESPONSE_TEXT | TEXT | User's response content |
| LAST_MOD_BY | VCHAR 18 | Last user to modify this row |
| LAST_MOD_DT | DATETIME | Date this row last modified |
| CREATED_BY | VCHAR 18 | User who created this row |
| CREATION_DT | DATETIME | Date this row was created |
| ACCESS_LEVEL | INT | Access level needed to view this row |

TABLE 7

Name: ARCH_E-MAIL
Comments: Table holds response data from individual users.

| Field Name | Data Type | Purpose |
|---|---|---|
| ARCH_DATAGEM GROUP_ID | INTEGER | datagem group being e-mailed about |
| E-MAIL_ID | AUTOINC | Unique e-mail ID |
| RESP_FLAG | CHAR 1 | Y = User has responded to this e-mail |
| REMINDER_NUMBER | INT | Number of previous e-mail to this user + 1 |
| LAST_MOD_BY | VCHAR 18 | Last user to modify this row |
| LAST_MOD_DT | DATETIME | Date this row last modified |
| CREATED_BY | VCHAR 18 | User who created this row |
| CREATION_DT | DATETIME | Date this row was created |
| ACCESS_LEVEL | INT | Access level needed to view this row |

The invention has been described in terms of particular embodiments as described and illustrated. Modifications may be made to the embodiments described by one of ordinary skill in the art without departing from the spirit and scope of the invention as defined in the following claims.

What is claimed is:

1. A method for managing sales data, comprising:
   storing a plurality of data components as groups of data components in database, the plurality of data components comprising information relating to a company's products or services, information relating to customers, said data components created as reusable textual data components for later reassembly into a larger sales or marketing compilations, wherein a structure of the data components in the database is configured to provide logic that permits reassembly of the data components into at least one of visual data sales or marketing Interfaces and sales or marketing documents;
   including sales or marketing information comprising product and services information, product and service capabilities; strategic vision, competitor information, marketing third-party information, technical definitions, benefit statements, value propositions, customer testimonials, customer success stories, customer requirements with a product, customer reason to buy, solutions offered by sales representatives to customers, analyst comments, competitive comparisons, competitive advantages; market segment nuances, special industry requirements, a prospect's level in the company; customer quotes, quotes or endorsements;
   assigning a subset of the plurality of users to a content review group ("CRG");

notifying each user in the CRG to review content stored in the database and said input data components, and to provide content review input regarding individual data components of a group of data components, wherein the input comprises a least one of the following:
  indicating whether data components are accurate;
  entering sales and marketing comments regarding the data components; and
  entering edits to the data components;
receiving and storing the input;
notifying a content director ("CD") to review the CRG's content review input, wherein the review comprises at least one of the following:
  editing the comments entered;
  deleting the comments entered; and
  consolidating the input;
said CD determining if said data component should be stored in a central database;
based upon the determination, storing the reviewed date components in the central database;
in response to a query to the data components in the central database generating real time marketing messages to sales representatives that align each of customer requirements with a product and solution offered by the sales representative and
displaying said messages as a visual data interface or producing as sales or marketing document.

2. The method of claim 1, wherein notifying each user in the CRG comprises:
  setting an active group flag for a CRG that is designated to participate in review;
  setting an active data component group flag for a data component group that is to be reviewed; and
  transmitting an electronic mail ("e-mail") to each user in the CRG having the active group flag set, wherein the e-mail requests each user to participate in reviewing the data component group having the active data component flag set.

3. A system for collecting and managing sales data, comprising:
  a central database that stores information relating to a plurality of products available from a plurality of suppliers, wherein the information is input by a plurality of users and is stored as data component groups in the central database, wherein at least a portion of the information associate specific capabilities of products and services with customer requirements for a product or solution;
  wherein said data components comprise smaller pieces of the input data at a sub-document level and said data components may be reassembled into larger sales compilations,
  input data including information selected from product and services information, product and service capabilities; strategic vision, competitor information, marketing, third-party information, technical definitions, benefit statements, value propositions, customer testimonials, customer success stories, analyst comments, competitive comparisons, customer requirements, customer reason to buy, solutions offered by sales representative to customers, competitive advantages; market segment nuances and special industry requirements, a prospect's level in the company; customer quotes, analyst quotes, press quotes and endorsements;
  at least one World Wide Web server ("Web server");
  a plurality of processors, at least one of which stores an authoring application, comprising,
  an administrative module; and
  a server component that periodically polls the central database to determine when to notify content review group ("CRG") members requesting review of a data component group to perform quality control review of the data; and
  hypertext markup language ("HTML") pages that display data components of the data component group, and receive review input based on a determination from the CRG members that is stored in the database;
  said authoring application validating that the content is relevant to end user requirements and is up-to date the content being used in providing real time sales messages to sales representatives that concurrently align customer requirements with a product and solution offered by the sales representative that is displayed as a visual data interface or provided as a sales or marketing document.

* * * * *